United States Patent
Dunsky et al.

(10) Patent No.: US 10,282,781 B2
(45) Date of Patent: May 7, 2019

(54) DATA ANALYTICS DATABASE AND PLATFORM SYSTEM AND METHOD

(71) Applicant: Federal Housing Finance Agency, Washington, DC (US)

(72) Inventors: Robert M. Dunsky, Washington, DC (US); Xiaoming Zhou, Washington, DC (US); Michael Kane, Washington, DC (US); Ming H. Chow, Washington, DC (US); Xiaoqiang Hu, Washington, DC (US); Andrew P. Varrieur, Washington, DC (US)

(73) Assignee: Federal Housing Finance Agency, Washington, DC (US)

( * ) Notice: Subject to any disclaimer, the term of this patent is extended or adjusted under 35 U.S.C. 154(b) by 741 days.

(21) Appl. No.: 14/795,470

(22) Filed: Jul. 9, 2015

(65) Prior Publication Data

US 2017/0011457 A1    Jan. 12, 2017

(51) Int. Cl.
 *G06Q 40/02*   (2012.01)
 *G06Q 40/00*   (2012.01)
 *G06Q 50/16*   (2012.01)

(52) U.S. Cl.
 CPC ........ *G06Q 40/025* (2013.01); *G06Q 50/16* (2013.01)

(58) Field of Classification Search
 CPC ....... G06Q 40/025; G06Q 40/02; G06Q 40/06
 See application file for complete search history.

(56) References Cited

U.S. PATENT DOCUMENTS

| | | | |
|---|---|---|---|
| 7,020,631 B2 | 3/2006 | Freeman et al. | |
| 8,015,091 B1* | 9/2011 | Ellis ...................... | G06Q 40/00 705/35 |
| 8,131,637 B1 | 3/2012 | Rupp et al. | |
| 8,380,619 B2 | 2/2013 | Miles et al. | |
| 8,401,950 B2 | 3/2013 | Lyons et al. | |
| 8,438,096 B1 | 5/2013 | Fashenpour et al. | |
| 8,515,862 B2 | 8/2013 | Zhang et al. | |

(Continued)

OTHER PUBLICATIONS

Balakrishnan, Ramani; "Mortgage Analytics for Efficient Servicing"; article published in the HCL, Communique, Your Window to the Financial Services World, 2012.

*Primary Examiner* — Hao Fu
(74) *Attorney, Agent, or Firm* — Rahman LLC

(57) ABSTRACT

A data analytics platform system includes a first database including economic forecast, house pricing, unemployment, and interest rate data object structures. A second database includes data object structures associated with attributes of mortgage loans and borrowers. A first module performs projections for predicting a monthly status on performing and modified performing mortgage loans. A second module performs projections of lifetime outcomes for delinquent mortgage loans. A third module performs calculations of mortgage loan level credit losses and timing parameters of loan loss recognition attributes. A fourth module performs calculations of forecasted mortgage loan performance attributes, mortgage loan contract terms, and interest rates to generate mortgage loan level cash flow data analytics. A fifth module summarizes projections of data performance analytics over a forecasted period of time, and creates an electronic summary report of the projections. An electric signal generator, a signal converter, and a display device output the electronic report.

20 Claims, 12 Drawing Sheets

(56) References Cited

U.S. PATENT DOCUMENTS

| | | | |
|---|---|---|---|
| 8,700,522 B2* | 4/2014 | Moore | G06Q 40/025 |
| | | | 705/35 |
| 8,775,291 B1 | 7/2014 | Mellman et al. | |
| 8,788,402 B2 | 7/2014 | Nash et al. | |
| 2009/0024539 A1* | 1/2009 | Decker | G06Q 40/02 |
| | | | 705/36 R |
| 2009/0189922 A1* | 7/2009 | Toyooka | G09G 3/2022 |
| | | | 345/690 |
| 2010/0293091 A1 | 11/2010 | Kurczodyna | |
| 2011/0087610 A1* | 4/2011 | Batada | G06F 21/72 |
| | | | 705/318 |
| 2012/0191579 A1* | 7/2012 | Ahn | G06Q 30/04 |
| | | | 705/30 |
| 2012/0254066 A1 | 10/2012 | Glomski et al. | |
| 2013/0091051 A1 | 4/2013 | Ginn | |
| 2013/0218807 A1 | 8/2013 | Liao et al. | |
| 2014/0136294 A1 | 5/2014 | Martinovic et al. | |
| 2015/0088783 A1 | 3/2015 | Mun | |

* cited by examiner

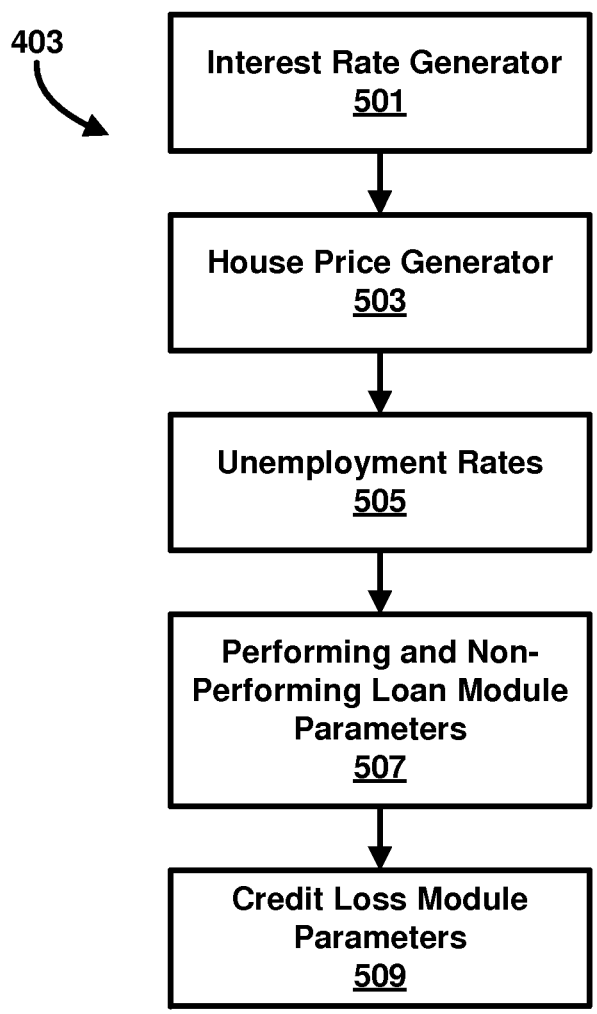

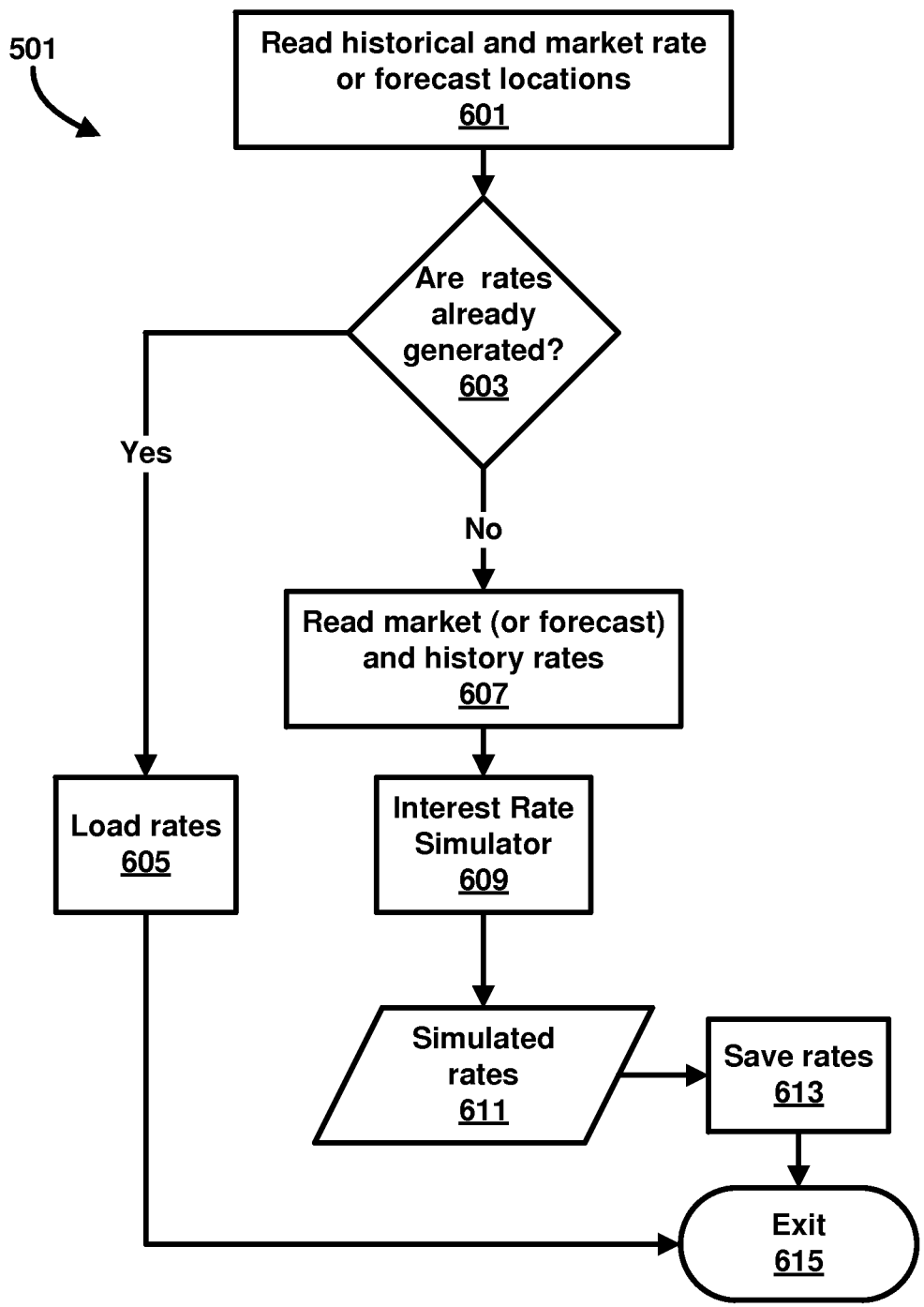

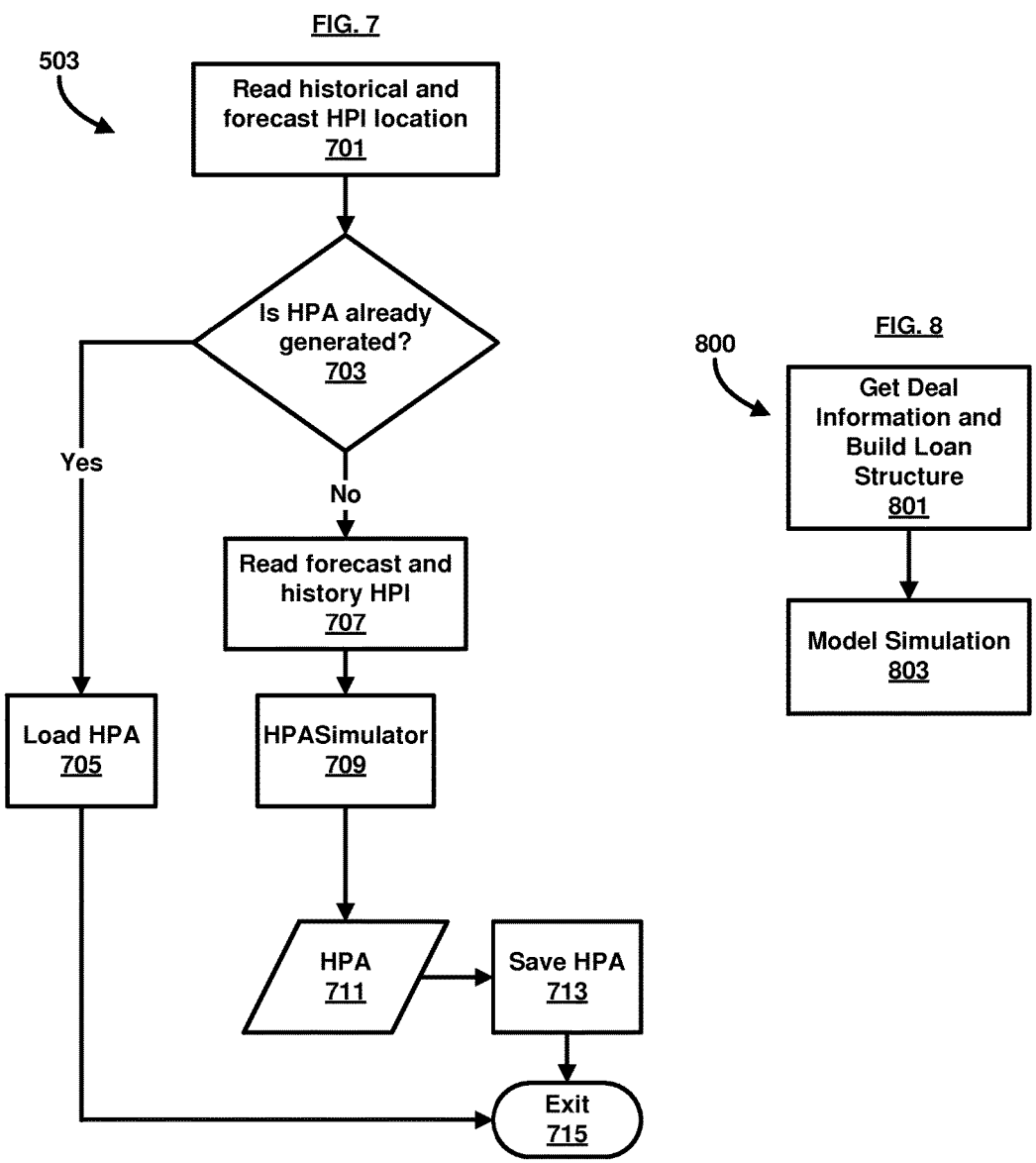

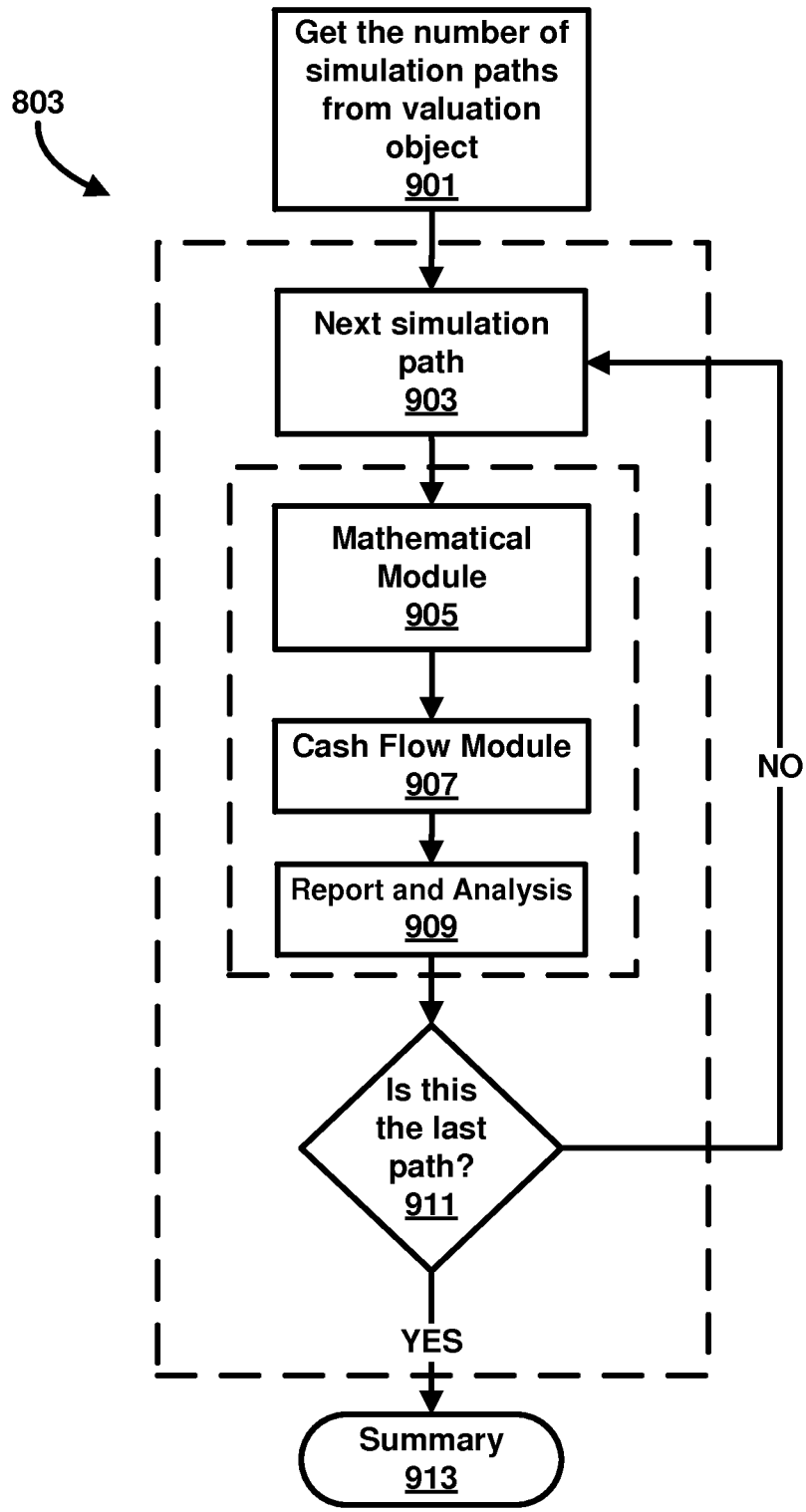

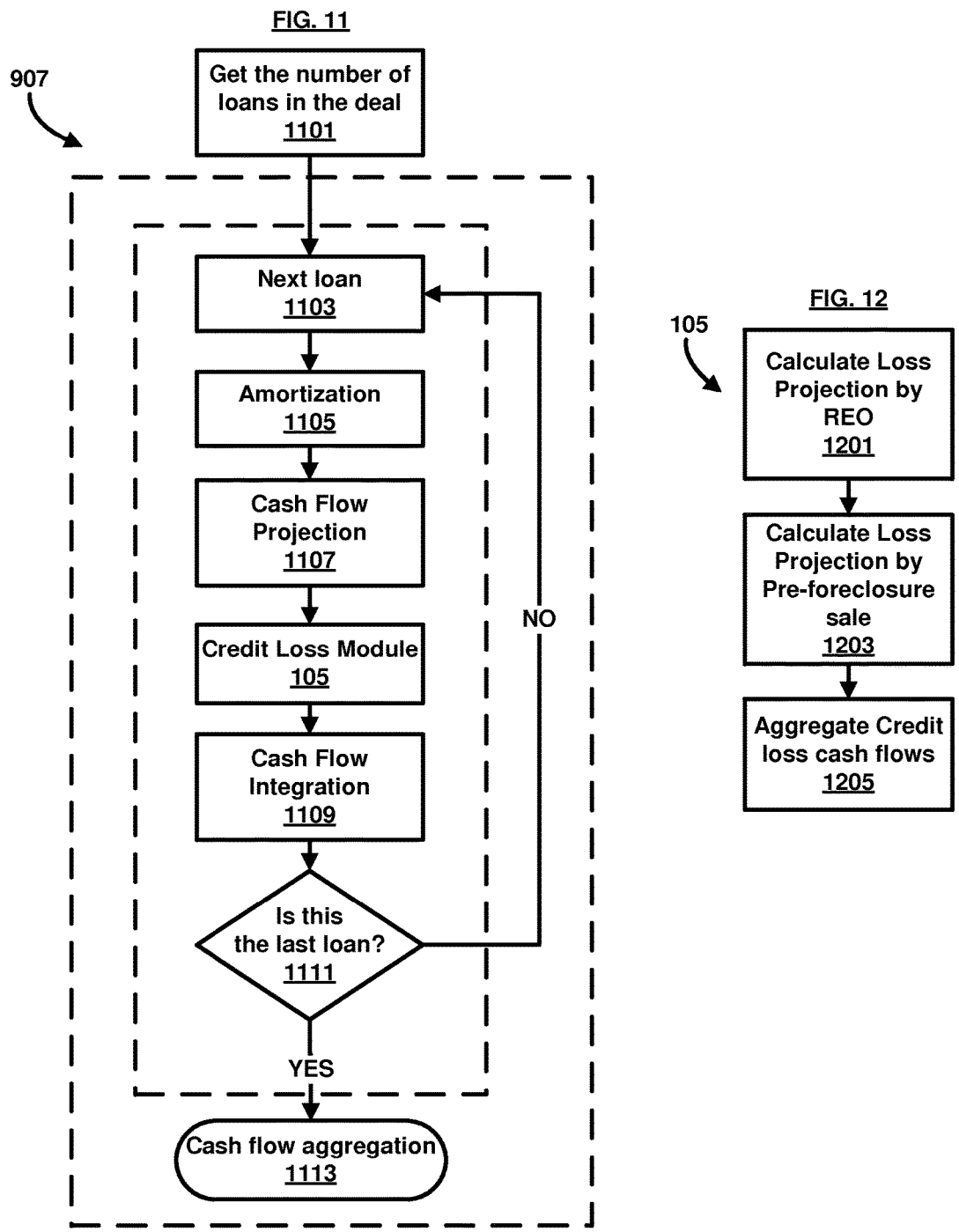

US 10,282,781 B2

DATA ANALYTICS DATABASE AND PLATFORM SYSTEM AND METHOD

BACKGROUND

Technical Field

The embodiments herein generally relate to database technologies, and more particularly to database systems used for data analytics processing, storage, and retrieval.

Description of the Related Art

The Federal Housing Finance Agency (FHFA) maintains various mortgage-related data in order to perform analysis, evaluation, and conduct policy studies, among other uses as it relates to U.S. housing and mortgage indicators. The mortgage industry is ripe with various forms of data, which requires empirical analysis to allow government entities, mortgage providers, and banks to understand trends in the mortgage industry and determine appropriate responses to historical data and make forecasts for future requirements, products, and services. FHFA, in the unique role as regulator of the Federal National Mortgage Association (Fannie Mae) and the Federal Home Loan Mortgage Corporation (Freddie Mac) (collectively, "Enterprises") identified a need for an independent empirical view. Academic empirical studies may suffer from a lack of high quality data, while empirical work from inside the industry typically represents a specific view. The FHFA maintains several vendor platforms from which an independent view is possible, yet these platforms tend to be inflexible and opaque. Accordingly, there is a need for a database system and platform that offers flexibility and transparency to carry out the FHFA's responsibilities.

SUMMARY

In view of the foregoing, an embodiment herein provides a data analytics platform system comprising a first computer database comprising economic forecast data object structures, house pricing data object structures, unemployment data object structures, and interest rate data object structures; a second computer database comprising a plurality of data object structures associated with attributes of mortgage loans and attributes of borrowers of the mortgage loans; a first computer module containing a first electronic circuit that processes a first set of computer logic instructions, wherein the first computer module is directly and/or communicatively connected to an output of the first computer database, wherein the first set of computer logic instructions comprises and/or creates data analytical projections for predicting a monthly status on performing and modified performing mortgage loans, and wherein the monthly status comprises whether the mortgage loans are current, prepaid, or delinquent; a second computer module containing a second electronic circuit that processes a second set of computer logic instructions, wherein the second computer module is directly and/or communicatively connected to each of an output of the first computer database and an output of the first computer module, and wherein the second set of computer logic instructions comprises and/or creates data analytical projections of lifetime outcomes for delinquent mortgage loans; a third computer module containing a third electronic circuit that processes a third set of computer logic instructions, wherein the third computer module is directly and/or communicatively connected to an output of the first computer database, and wherein the third set of computer logic instructions comprises and/or creates data analytical calculations of mortgage loan level credit losses and timing parameters of loan loss recognition attributes; a fourth computer module containing a fourth electronic circuit that processes a fourth set of computer logic instructions, wherein the fourth computer module is directly and/or communicatively connected to an output of each of the first computer module, the second computer module, and the third computer module, and wherein the fourth set of computer logic instructions comprises and/or creates data analytical calculations of forecasted mortgage loan performance attributes, mortgage loan contract terms, and interest rates to generate mortgage loan level cash flow data analytics; a fifth computer module containing a fifth electronic circuit that processes a fifth set of computer logic instructions, wherein the fifth computer module is directly and/or communicatively connected to an output of the fourth computer module, and wherein the fifth set of computer logic instructions summarizes projections of data performance analytics over a predetermined forecasted period of time, and creates an electronic summary report of the projections; an electric signal generator embedded in an electronic circuit and communicatively and operatively connected with the first, second, third, fourth, and fifth computer modules for generating an electric signal comprising data associated with the electronic summary report of the projections; a signal converter for converting the electric signal into a plurality of pixels; and a display device for displaying the plurality of pixels, wherein the display device arranges the plurality of pixels into the electronic summary report of projections.

The projections may comprise mortgage performance from a current age of the mortgage loan to termination, including foreclosure alternatives and the resolution of real estate owned (REO), and wherein the projections are configured as data structures comprising statistical probabilities of termination to performing loan balances. The system may further comprise a sixth computer module containing a sixth electronic circuit that processes a sixth set of computer logic instructions, wherein the sixth computer module is directly and/or communicatively connected to an output of the first computer database, and an input of each of the first, second, and third computer modules, and wherein the sixth set of computer logic instructions provide a status of a mortgage loan including any of whether a loan is performing, non-performing, undergoing prepayment, and in default.

The third computer module may comprise a first sub-computer module containing a first sub-electronic circuit that processes a first sub-set of computer logic instructions, wherein the first sub-computer module is directly and/or communicatively connected to an output of the second computer module, wherein the first sub-set of computer logic instructions determine a charge-off amount comprising mortgage loan foreclosure expenses that are accumulated until a date of title transfer of a property associated with the mortgage loan, and wherein the charge-off amount equals a sum of expected net REO sale proceeds, paid expenses, and three months of paid interest less a mortgage insurance claim amount; and a second sub-computer module containing a second sub-electronic circuit that processes a second sub-set of computer logic instructions, wherein the second sub-computer module is directly and/or communicatively connected to an output of the first sub-computer module, and wherein the second sub-set of computer logic instructions determine a REO operating expenses amount comprising paid expenses and monthly declines in the REO property value of the property.

The system may further comprise a deal valuation computer module containing an electronic circuit that processes a set of computer logic instructions, the deal valuation computer module comprising an input computer module containing an electronic circuit that processes a set of computer logic instructions for processing a user interface file that determines the number of mortgage deals to be evaluated; an electronic processing circuit that processes a set of computer logic instructions for reading, processing, and configuring economic scenarios and parameters, behavioral model parameters, and severity parameters and configuring the parameters into data objects; and a simulating computer module containing an electronic circuit that processes a set of computer logic instructions for constructing all loan level data objects into data structures; producing cash flow projection data points for each loan; and aggregating data cash flows into computerized summary reports.

The electronic processing circuit may comprise an interest rate generator computer module that processes a set of computer logic instructions for building new interest rate data object structures or loads existing interest rate data object structures, or generating simulated interest rate data object paths internal to the interest rate generator computer module; and a house price generator computer module that processes a set of computer logic instructions for loading existing house price data object structures or building new data object structures using house price indexes (HPIs) from object files, or generating simulated house price appreciation data object paths. The interest rate generator computer module may process a set of computer logic instructions comprising reading historical and market rate or forecasted locations using a first processing circuit; and determining, using a signal processing circuit, whether data object structures containing interest rate data have already been generated by the interest rate generator computer module.

The interest rate generator computer module may process a set of computer logic instructions comprising loading the interest rate data object structures as a data file for processing by the interest rate generator computer module. The interest rate generator computer module may process a set of computer logic instructions comprising reading market and historical interest rates using a second processing circuit; generating simulated interest rates configured as data object structures; and storing the simulated interest rates in a hardware-enabled storage device.

The house price generator computer module may process a set of computer logic instructions comprising reading historical and forecasted house price index location data object structures using a first processing circuit; and determining, using a signal processing circuit, whether house price appreciation rate (HPA) data object structures have already been generated by the house price generator computer module. The house price generator computer module may process a set of computer logic instructions comprising loading the HPA data object structures as a data file for processing by the house price generator computer module. The house price generator computer module may process a set of computer logic instructions comprising reading forecasted and historical house price index location data object structures using a second processing circuit; generating HPA data object structures; and storing the HPA data object structures in a hardware-enabled storage device.

The system may further comprise a simulator computer module that processes a set of computer logic instructions comprising retrieving deal data that comprises data of a portfolio of various mortgage loans saved in object files; building loan data object structures; saving the loan data object structures in a local hardware-enabled storage device; and performing at least one model simulation based on the saved loan data object structures using a simulation module that processes a set of computer logic instructions. The simulation module may process a set of computer logic instructions comprising retrieving a number of simulation data object paths from the loan data object structures; determining a next simulation data object path; performing mathematical calculations of the simulated data object path using a mathematical computer module that processes a set of computer logic instructions; processing a cash flow computer module that processes a set of computer logic instructions; running a report and analysis computer module that processes a set of computer logic instructions; and determining whether the simulated data object path is a last data object path to be simulated.

The mathematical computer module may process a set of computer logic instructions comprising retrieving a number of loans in a deal data object structure; calculating delinquency and prepayment probability statistical parameters configured as data object files based on data models established by the first computer module; calculating delinquency to final resolution probability statistical parameters configured as data object files based on data models established by the second computer module; and determining if a current loan under analysis saved in a data object file is a last loan to be analyzed by the mathematical computer module.

The cash flow computer module may process a set of computer logic instructions comprising retrieving a number of loans in a deal data object structure; processing the deal data object structure using an amortization computer module that processes a set of computer logic instructions comprising amortizing loan balances based on a product type of the loan; sequentially calculating several current period cash flows based on a performing loan balance from a prior period using a cash flow projection computer module that processes a set of computer logic instructions; calculating credit losses based on non-performing dollars that are projected to transition from delinquency status to REO, and from delinquency status to pre-foreclosure sale using the third computer module; integrating cash flows from the amortization computer module, the cash flow projection computer module, and the third computer module; and aggregating credit loss cash flows and outputting aggregated summaries as electronic reports presented on the display device.

The third computer module may process a set of computer logic instructions comprising projecting credit losses on loan balances that are 90+ days delinquent at a beginning of a projection period, and on loan balances that are projected to go to either foreclosure completion or to an alternative foreclosure resolution from the second computer module. The third computer module may process a set of computer logic instructions comprising calculating a credit loss timeline and a REO property value using a processing module that processes a set of computer logic instructions; and determining, using a first processing circuit, whether there is mortgage insurance coverage associated with a particular mortgage loan.

The third computer module may process a set of computer logic instructions comprising calculating a mortgage insurance payment using a module that processes a set of computer logic instructions; and determining, using a second processing circuit, if a mortgage insurance conveyance exists. The third computer module may process a set of computer logic instructions comprising calculating a charge-off amount using the first sub-computer module; and calculating a REO expense amount using the second sub-computer module.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a block diagram illustrating a data analytics process of inputs according to an embodiment herein;

FIG. 6 is a block diagram illustrating the interest rate generator module of FIG. 5 according to an embodiment herein;

FIG. 7 is a block diagram illustrating the house price generator module of FIG. 5 according to an embodiment herein;

FIG. 8 is a block diagram illustrating a run simulation module according to an embodiment herein;

FIG. 9 is a block diagram illustrating the model simulation module of FIG. 8 according to an embodiment herein;

FIG. 11 is a block diagram illustrating the cash flow module of FIG. 9 according to an embodiment herein;

FIG. 12 is a block diagram illustrating the credit loss module of FIG. 1 according to an embodiment herein;

DETAILED DESCRIPTION

Figure 1:
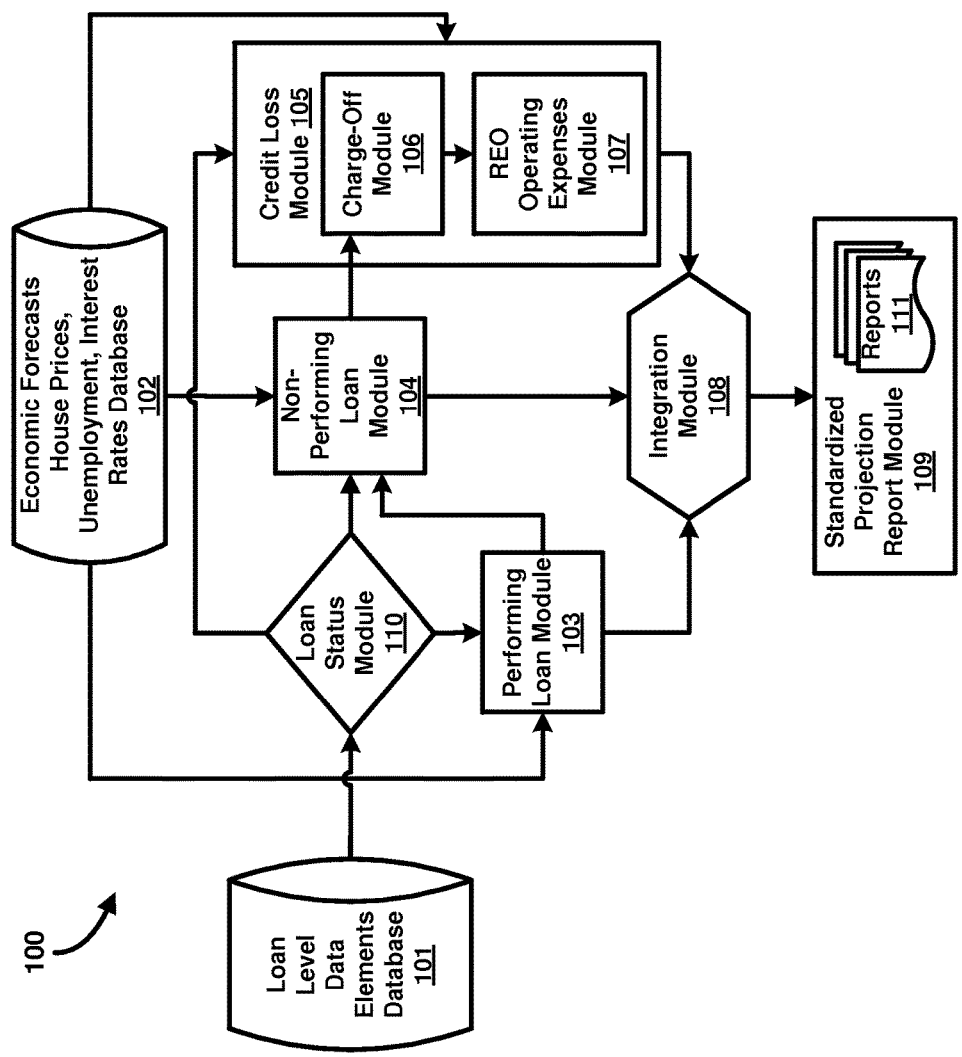
FIG. 1 is a block diagram illustrating a data analytics database and platform system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. For instance, the dates and time periods described below are provided as examples that are used for conducting the experimentation that is also described, and accordingly any dates or time periods may be used in accordance with the embodiments herein. Furthermore, any reference to a stressed time period is not limited to the particular period of time described, but rather any period of time that is considered to be a stressed time period is applicable in accordance with the embodiments herein. Therefore, the examples should not be construed as limiting the scope of the embodiments herein.

The embodiments herein provide a database system and analytics platform that integrates econometric loan performance models, loan level data, and external economic forecasts to project mortgage cash flows, and presenting the data for a user in a robust and easily accessible format. Referring now to the drawings, and more particularly to FIGS. 1 through 15, where similar reference characters denote corresponding features consistently throughout the figures, there are shown preferred embodiments.

FIG. 1 illustrates a data analytics platform 100 according to an embodiment herein. The various modules described herein and illustrated in the figures are embodied as hardware-enabled modules and may be configured as a plurality of overlapping or independent electronic circuits and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer processing unit (CPU) that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

There are two sources of external inputs to the analytics platform 100: loan level data stored in a loan level database 101, and economic forecasts stored in an economic forecast database 102. The economic forecasts include projections of house prices, interest rates and unemployment rates through the forecast horizon. As used herein, the forecast horizon (or forecast period) is defined as the time interval between the first projection period and the last projection period. The forecast horizon can be calculated from elements in the valuation definition as further described below with respect to the deal valuation module 303 (of FIG. 4) and includes the first projection month (calendar date) and the number of projection periods (integer). Both vendor-supplied economic forecasts and FHFA projections of economic variables are stored in the economic forecast database 102. These economic forecasts cover a wide range of economic environments from baseline to highly optimistic to extremely stressful economic conditions. The economic forecast database 102 is updated periodically (e.g., daily, weekly, monthly, or quarterly).

The loan level data elements in database 101 are the second source of external inputs; these include approximately thirty variables per loan comprising loan attributes and borrower characteristics. The platform 100 projects mortgage performance from the loan's current age to termination, including foreclosure alternatives and the resolution of REO. The platform 100 applies projected probabilities of termination to performing loan balances such that a portion of the loan prepays, becomes delinquent and may resolve as a default each month. As used in accordance with the embodiments herein, when a loan is said to prepay (or default), only a portion of the loan is prepaying (or defaulting), not the whole loan. The status of a loan is determined by module 110.

The performing loan module 103 projects monthly loan level prepayment and 90-day delinquency probabilities on performing and modified performing loans. Loan data is entered into module 103 if the loans are current, less than 90 days delinquent, or forecasted to cure from a delinquency during the simulation. The prepayment and delinquency equations are functions of borrower characteristics, loan characteristics, home values and other economic variables. Multiple pairs of prepayment and delinquency equations collectively cover several loan products and modified loans guaranteed or owned by the Enterprises.

The non-performing loan module 104 projects lifetime outcomes for delinquent loans. Loan data is entered into module 104 if the loans are 90 to 180 days delinquent at the beginning of the projection, or if they are predicted to become delinquent within the performing loan module. The module 104 outputs four mutually exclusive loan-specific probability factors monthly, over the forecast period: foreclosure completion (REO), voluntary prepayment, foreclosure alternative resolutions and re-performance (cure). The foreclosure alternative resolutions include deed-in-lieu of foreclosure, pre-foreclosure sale (short sale), and third party sale data. A loan is defined as re-performing when all arrearages are paid and the cure is not due to a modification or restructuring. The models are a function of borrower characteristics, house prices and state legal structures. The timing and likelihood of delinquency and prepayment for performing loans varies across mortgage product types, however, for non-performing loans, the product type does not, but could impact the timing and likelihood of the resolution outcome. Unlike the performing loan module 103 where multiple product level models are constructed, only one set of equations is estimated for non-performing loans in the non-performing loan module 104.

The credit loss module 105 calculates loan level credit losses and determines the appropriate timing of loss recognition. Loan data is entered into module 105 if they are greater than 180 days delinquent at the start of the projection or are projected to generate a credit loss from the non-performing module. Credit losses are measured as charge-offs and REO operating expenses. Charge-offs and REO operating expenses are calculated by a charge-off module 106 and REO operating expenses module 107, respectively, at the loan level using an accounting approach.

The integration module 108 combines the forecasted performance elements, mortgage contractual terms, and interest rates to generate loan level cash flows. Module 108 outputs are aggregated across loans into a standardized projection report module 109. The standardized projection report module 109 summarizes projections of portfolio performance measures over the forecast horizon. Key credit loss elements reported in a report generated by module 109 are charge-offs and REO operation expenses. Other variables used by the module 109 to generate the report include performing balances, dollars of new 90-day delinquencies, scheduled and unscheduled principal payments, guarantee fee income, and credit enhancement claims.

The performing loan module 103 processes a series of Multinomial Logit (MNL) equations that predict the loan's monthly status: current, prepaid or delinquent. Using MNL equations provides a convenient method for structuring prepayment and delinquency risk as a discrete-time competing hazard. Using the estimated equation parameters, the platform calculates the conditional probability of prepayment and 90-day delinquency as:

$$P(prepay_{i,t}) = \left( \frac{\exp(x'_{i,t}\hat{\beta}_{pp})}{1 + \exp(x'_{i,t}\hat{\beta}_{pp}) + \exp(v'_{i,t}\hat{\beta}_{90})} \right), \text{ and}$$

$$P(f90_{i,t}) = \left( \frac{\exp(v'_{i,t}\hat{\beta}_{f90})}{1 + \exp(x'_{i,t}\hat{\beta}_{pp}) + \exp(v'_{i,t}\hat{\beta}_{90})} \right).$$

The probability of remaining current is calculated as:

$P(\text{current}_{i,t}) = 1 - P(f90_{i,t}) - P(prepay_{i,t})$.

In this regard, $\hat{\beta}_{pp}$ and $\hat{\beta}_{f90}$ represent the estimated prepayment and 90-day delinquency parameter vectors, while $x_{i,t}$ and $v_{i,t}$ represent the variables in the prepayment and delinquency equations for the ith loan at time period t. The resulting prepayment probability represents the likelihood that loans will prepay in the current month, given that it has neither prepaid nor become 90 days delinquent in the prior month. The delinquency probability is similarly defined.

Fifteen loan product specific models are estimated using historical loan-level data in addition to a single model for all modified loans. The treatment of performing modified loans is described in further detail below. The loan product models are based on the following eight data-defined products:

Fixed Rate Products:
40 yr. fixed rate mortgage (FRM), 30 yr. FRM, 20 yr. FRM, 15 yr. FRM.

Adjustable Rate Products:
10/1 adjustable rate mortgage (ARM), 7/1 ARM, 5/1 ARM, 3/1 ARM.

Separate loan product models are estimated for each Enterprise, with the exception of the fixed rate 40-year loan product and modified loans, which are estimated with data combined from both Enterprises due to the low volume of fixed rate 40-year loans and modified loans. When possible, the entire historical population of loans is used for estimation. In the case of fixed rate 30-year loans, a stratified proportional sample of three million loans is selected for each Enterprise. The stratification variables include, for example: geography, credit scores, origination date, property type, loan size, original loan to value (LTV) and occupancy. The marginal distributions of the population and the selected samples are compared to ensure representativeness to the loan population.

The eight loan products for each Enterprise represent approximately 99 percent of the mortgages originated by the Enterprises since 1995. The remaining loans are comprised mostly of single family balloon mortgages and step rate mortgages. These loans are assigned to the product model based on their maturity term, for example, a 30-year step rate mortgage is assigned to the 30-year fixed rate model.

Common Independent Variables in the Performing Loan Module 103:

The common independent variables across all of the estimated behavioral equations for performing loans are described below. Most of the continuous explanatory variables are constructed as spline functions, with the locations of the spline knots varying across models. One preferable aspect of the spline specification is that it avoids sudden jumps within a continuous variable while allows for the non-linearity relationship between independent and dependent variable.

Loan Seasoning:

The loan age, or seasoning, is included in the models to capture changes in the delinquency and prepayment tendencies over the life of the loan. The seasoning functions in the models are constructed as a set of age spline variables; the spline knots are chosen from the product specific hazard curve(s) that best represents the product loan population.

Vintage-Fixed Effects:

In lieu of a constant term, each model is estimated with a series of vintage-specific fixed effects. The estimated fixed effects capture unobservable changes in underwriting standards and other non-observables that are not controlled for elsewhere in the model.

Seasonality:

All of the models include a set of eleven monthly indicators (dummy variables) to capture seasonality. Seasonality is a common phenomenon in mortgage performance: prepayments during the summer months are typically borrowers moving, while late payments frequently occur in April. The estimated seasonality parameters measure sensitivity of prepayment and delinquency relative to January, the omitted month.

Down Payment at Origination:

Down payment is measured in terms of the original loan-to-value (LTV) ratio; loan size is the balance of the loan at origination and value is the appraised value at origination. Underwriting requirements typically predetermine loan down payments. Enterprise loans require a minimum original LTV of eighty percent on first lien mortgages, or, if the down payment is less than twenty percent, then a form of credit enhancement is required, (e.g. mortgage insurance). The original LTV enters the model as a set of spline variables, where the spline knots are selected at approximately the $20^{th}$, $40^{th}$ and $80^{th}$ percentiles of original LTV in the estimation data.

Credit Score at Origination:

The Enterprises fully adopted credit scores in their underwriting criteria in the mid-1990s. Nearly 100 percent of loans originated since 1995 in the estimation data contain credit scores. Credit scores are typically reported from all three of the well-known credit repositories. The model only uses one credit score per loan. When multiple scores are available per borrower, the model uses the lower of the two scores if two are reported, and the middle score if three scores are reported. The lowest score across all borrowers is used when co-borrowers are reported in the loan data. Credit scores are specified as five spline variables; the spline knots are selected based on the distribution of credit scores in the estimation data.

Spread at Origination (SATO):

The SATO variable captures the difference between the borrower's mortgage rate and the prevailing interest rate reported in the Primary Mortgage Market Survey (PMMS) on the date of the origination. Historically, this spread measures the borrower's price of credit relative to the market average. To the extent that borrower credit is priced imperfectly, the SATO measure captures other unobservables in the transaction. There are two SATO spline variables (two spline segments, one spline knot) in each model. The spline knot is located at the median value of the difference between the initial rate on the mortgage and the market rate (PMMS rate) in the month of the first payment.

Loan Size at Origination:

Loan size (in thousands) is an important factor in the prepayment equation; the value of refinancing a loan is proportional to the size of the loan. For some mortgage products, loan size is also inversely related to the incidence of delinquency. The loan size at origination enters the specification as a series of four spline variables; the spline knots are selected based on the distribution of loan size in the estimation data sets.

Time Varying Credit-Equity Function (Credit Score Current-LTV Interaction):

The credit equity function is the interaction between the original credit score group indicator and spline variables of the current LTV (or mark-to-market LTV, MTM LTV) over the observed life of the loan. LTVs are updated in the model via HPIs from the economic forecast database 102. The FHFA state-level purchase-only index is used for both model estimation and forecasting. The function enables measuring the borrower's responsiveness to changes in current LTV while controlling for the borrower's original credit score. There are (k) groups of credit score indicators; each borrower's score falls uniquely into one of the five buckets (k=5). The width of each bucket is based on the distribution observed in the estimation data. The time dependent MTM LTV ratio is expanded into (h) spline variables. The length and locations of the spline segments are defined from the estimation data. The credit equity function in compact format for the $i^{th}$ loan in period t is defined as:

$$\text{Credit\_Equity}_{i,t} = \sum_{h=1}^{5} \sum_{k=1}^{5} \hat{\beta}_{h,k} \text{Credit\_Score}_{i,t,k} \text{MTM\_LTV}_{i,t,h}.$$

where $\text{Credit\_Score}_{i,t,k}$ takes the value of zero or one, depending on the loan's credit score, and $\text{MTM\_LTV}_{i,t,h}$ are a series of spline variables based on the current LTV of the loan. For each combination of credit score groups (k=1 to 5) and MTM LTV range (h=1 to 5) a $\hat{\beta}_{h,k}$ parameter is estimated as provided in Table 1 below:

TABLE 1

Estimated Credit Equity Parameters

| Credit Score Group | MTM LTV Spline Variables | | | | |
|---|---|---|---|---|---|
| | 0 to 60 | 60 to 70 | 70 to 85 | 85 to 95 | 95 to 120 |
| 350 to 682 | 2.921 | 1.335 | 1.816 | 3.463 | 0.913 |
| 682 to 720 | 2.154 | 3.384 | 3.989 | 3.078 | 1.444 |
| 720 to 750 | 1.921 | 4.088 | 4.650 | 4.096 | 1.755 |
| 750 to 780 | 1.485 | 5.424 | 5.109 | 5.571 | 2.011 |
| 780 to 850 | 1.307 | 5.306 | 5.025 | 6.961 | 2.125 |

Table 1 displays credit equity function parameter estimates (not marginal effects) from the delinquency equation for a 30-year fixed rate product model. Table 1 is included only to demonstrate that the estimated parameter values vary across the MTM LTV spline variables for a given credit score group. A loan remains in one credit score group throughout the forecast period yet moves left and right in the table as the loan MTM LTV changes during the forecast period. The benefit of the credit equity function is that the marginal change in the probability of delinquency is not assumed to be constant across credit score groups or over the MTM LTV spline variables.

Time Varying Refinance Burnout Function:

The refinance function is constructed to capture the sensitivity of borrower prepayment behavior to changes in market interest rates. The refinance function is specified as the interaction between a refinance ratio and a burnout factor. The burnout factor captures the difference in the refinancing efficiency between two otherwise identical loans that have gone through different historical interest rate experiences. The refinance function is defined as:

$$\text{refinance\_function}_{i,t} = \text{refinance\_ratio}_{i,t} * burnout_{i,t}, \text{ where}$$

$$\text{refinance\_ratio}_{i,t} = \left(\frac{PMMS_{i,t=0}}{PMMS_{i,t}}\right)$$

The refinance ratio is constructed as the ratio of the PMMS rate for the ith loan at origination (t=0) to the current period PMMS rate. The PMMS rate is the current mortgage rate at time t. The refinance ratio is a pure macroeconomic measure of the value of the refinance option and devoid of borrower specific credit information; this is in contrast to the SATO. The burnout factor is defined in terms of the significantly positive refinance spread cumulated over the age of the mortgage, reflecting missed refinance opportunities. Explicitly, the burnout function is defined as:

$$burnout_{i,t} = \sum_{t=0}^{T} \text{MAX}\left(\frac{PMMS_{i,t=0} - PMMS_{i,t}}{PMMS_{i,t}} - 0.1, 0\right).$$

In accordance with the embodiments herein, it is assumed that a refinance opportunity occurs whenever the prevailing PMMS rate falls below the PMMS rate at origination by 10 percent.

The refinance burnout function should preferably have the qualitative behavior of an S curve, which typically represents the refinance incentive as a function of interest rates; when the refinance ratio is low, there is a constant base refinancing rate. As the refinance ratio increases, the refinancing rate also increases. However, when the refinance ratio exceeds a certain level, the refinancing rate should remain stable, at a high level. However, the behavior of this S function varies with the burnout level. The refinance function estimates multiple S functions as we categorize the loans into five buckets by the burnout function. The burnout refinance function is only included in the prepayment equations for the fixed rate products.

State Unemployment Rate:

The unemployment rate serves as a proxy for job loss of the borrower as well as to capture local economic activity. Although prepayment is generally insensitive to the unemployment rate, the delinquency rate increases with the unemployment rate. There are four unemployment spline variables in each model. The selection of the spline knots is based on the distribution of the unemployment rate of the states represented in the input data.

Yield Curve Spread:

The yield curve spread, measured by the difference between the 2-year and the 10-year swap rate, captures the slope of the swap curve and serves as a proxy for the state of the macro economy. In the absence of large scale monetary intervention, empirical evidence suggests an upward sloping yield curve presents a healthy macroeconomic environment. Existing borrowers would be expected to respond to a flattening of the yield curve when long-term rates decline as a refinance opportunity. Alternatively, when the yield curve inverts, although refinance opportunities may persist, delinquencies typically increase reflecting a weaker macroeconomic environment. Yield curve spread is only included in the prepayment equation.

Special Treatment of Performing Modified Loans:

Performing modified loans include loans that have been modified through the Home Affordable Modification Program (HAMP®), or the Enterprises' proprietary modification programs, and have not re-defaulted (90+ days delinquent). Performing modified loans are treated differently from unmodified performing loans. Modified loans, most of which were seriously delinquent before modification, have a higher likelihood of delinquency than unmodified performing loans. Modification of the mortgage terms (mortgage rate, amortization term and principal forbearance) and the delinquency status prior to modification are important variables in projecting the prepayment and re-default behaviors. A single prepayment and re-default model is developed and deployed for all modified loans.

The behavioral equations for modified loans are modeled in the same multinomial logit framework as unmodified performing loans described above. While most of the independent variables and all the economic variables used in the performing loan model are retained in the modified loan model, some independent variables are reconstructed. The reconstructed variables include loan age, seasonality, loan size and the refinance spread. Loan age for modified loans is measured from the modification date, and loan size is the post modification loan balance. Seasonality may be captured by a quarterly dummy variable instead of a monthly dummy due to the short performance history of modified loans. The refinance spread is defined as the modified interest rate of the mortgage less the prevailing mortgage rate and is constructed as a spline variable.

The independent variables for the performing loan behavioral equations that are not retained in the modified loans treatment are original vintage, original down payment, SATO and the credit equity function. Vintage is not considered for the modified loans treatment as most modifications occurred after 2009, and the economic environment did not changed significantly from 2009 to 2012. Down payment and SATO are also not retained as these two variables are not meaningful given that loan has been modified. Finally, the credit equity function is excluded to maintain a relatively simple structure for the modified loan equations.

Additional independent variables are added to the behavioral equations for modified loans:

Percentage Change in the Monthly Mortgage Payment:

The monthly payment on most modified loans is reduced through interest rate reductions, term extensions or principal forbearance. The monthly payment reduction represents a financial relief to the distressed mortgage borrower and should reduce the borrower's tendency to default on the loan. The percentage change in the monthly mortgage payment is constructed as a spline variable with the knots determined by the selected percentiles of the distribution of the monthly payment percentage change.

Delinquency Status Prior to Modification:

Deeply delinquent borrowers face a greater financial challenge than less delinquent borrowers to bring the payment status of the loan back to current. Deeply delinquent borrowers also have less flexibility to prepay the loan due to the large financial obligation of accrued or capitalized interest. The Delinquency Status prior to Modification is constructed as linear spline variables with knots at 3, 6 and 12 month delinquency.

Home Price Appreciation Since Modification:

Home Price Appreciation since Modification is measured as a percentage change of the home price since modification at the state level. A positive home price appreciation indicates an improved borrower's equity position in the property, and should reduce the borrower's probability to re-default on the mortgage. Home Price Appreciation is measured at the state level and is constructed as linear spline variables with knots determined by selected percentiles of the distribution of the percentage of the home price change.

The behavioral equations are estimated with performance history on Fannie Mae and Freddie Mac loans from June 2009 to December 2011. The behavioral equations can be estimated with any loan set over any reasonable historical period.

Loans enter into the non-performing module 104 if they are 90 to 180 days delinquent at the beginning of the projection, or if they are predicted to become 90 days or more delinquent (F90) during the forecast horizon. The module 104 computes four mutually exclusive lifetime probabilities conditional on a loan being at least 90 days delinquent: re-performance (cure), voluntary prepayment, alternative foreclosure resolution, and foreclosure completion. The lifetime probability of the loan resolving as REO is calculated as the residual of one less the other three computed probabilities. The alternative foreclosure resolutions include deed-in-lieu of foreclosure, pre-foreclosure sale, and third party sale. Re-performance is defined as a loan returning to current status without having been modified or restructured. The loans that are projected to be re-performing are treated as performing loans and are sent back to the Performing Loan Module.

The equations in the non-performing module are estimated simultaneously on a population of loans that became 90 days delinquent for the first time between 1997 and 2012. The estimation data excludes loans that became 90 or more days delinquent and were subsequently modified. The resolution of delinquent loans is jointly determined by the borrower and the servicer. Information on servicers is unobservable; therefore the equations are a function of borrower, house characteristics and state legal structures. The lifetime probability of each of the terminal states is represented below in a competing risks framework:

$$P(LifetimeSale_{i,t} | f90_{i,t}) =$$
$$\left( \frac{\exp(x'_{i,t}\hat{\beta}_{FCA})}{1 + \exp(x'_{i,t}\hat{\beta}_{FCA}) + \exp(v'_{i,t}\hat{\beta}_{RPerf}) + \exp(\omega'_{i,t}\hat{\beta}_{PP})} \right)$$

$$P(RPerf_{i,t} | f90_{i,t}) = \left( \frac{\exp(v'_{i,t}\hat{\beta}_{RPerf})}{1 + \exp(x'_{i,t}\hat{\beta}_{FCA}) + \exp(v'_{i,t}\hat{\beta}_{RPerf}) + \exp(\omega'_{i,t}\hat{\beta}_{PP})} \right)$$

$$P(lifetimePrepay_{i,t} | f90_{i,t}) =$$
$$\left( \frac{\exp(\omega'_{i,t}\hat{\beta}_{PP})}{1 + \exp(x'_{i,t}\hat{\beta}_{FCA}) + \exp(v'_{i,t}\hat{\beta}_{RPerf}) + \exp(\omega'_{i,t}\hat{\beta}_{PP})} \right), \text{ and}$$

$$P(LifetimeREO_{i,t} | f90_{i,t}) = 1 - P(LifetimeSale_{i,t} | f90_{i,t}) -$$
$$P(RPerf_{i,t} | f90_{i,t}) - P(LifetimePrepay_{i,t} | f90_{i,t})$$

Here, $\hat{\beta}_{FCA}$, $\hat{\beta}_{RPerf}$ and $\hat{\beta}_{PP}$ represent the equation specific parameters of exiting by a foreclosure alternative, re-performance and voluntary prepayment of the mortgage. The corresponding independent variable vectors are $x_{i,t}$, $v_{i,t}$ and $\omega_{i,t}$ for the ith loan at the time of the 90 day delinquency event, time t.

Independent Variables in the Non-Performing Loan Module:

There are seven groups of independent variables in the non-performing loan model, and an intercept term. Similar to the performing modified loan model, only one model is deployed for all non-performing loans. Consideration of explanatory variables is restricted to variables that are observable in the month of the first 90-day delinquency and for which economic forecasts are available.

Current LTV at the Delinquency Date:

In order to capture the level of equity or negative equity in the property, the current LTV (MTM LTV) of the loan in the month of the first 90 day delinquency is included as five spline variables. The spline knots are located at 68%, 82%, 99% and 120% current LTV. MTM LTV is calculated from the loan balance on the last paid installment, and house values are updated using the FHFA state-level purchase-only House Price Index.

Original Loan Size:

Similar to the performing loan module, original loan size (in thousands) is included in the model by five spline variables with knot locations based on the distribution of loan size in the delinquent loan data. The spline knots are located at $94 k, $150 k, $232 k, and $360 k.

Property Type:

The property type is represented by three indicator variables; condominium, planned urban development and manufactured housing. Single family detached residence serves as the comparator.

Stated Occupancy at Origination:

To differentiate between outcomes across owner occupants and non-owner occupants an indicator variable is included in all of the specifications. Relative to owner occupants, non-owner occupants are less likely to re-perform.

Mortgage Insurance Coverage:

For loans with mortgage insurance, two spline variables based on the level of insurance coverage are included in the specification. The spline knot is located at 25% coverage. The spline variables for loan without mortgage insurance are set at zero.

Credit Score at Origination:

Original credit scores enter into the model as five spline variables with spline knots located at 623, 661, 703, and 750. Original credit scores may no longer accurately represent the borrower's recent payment history, yet they remain statistically significant in the non-performing loan model.

State Unemployment at Delinquency Date:

Four unemployment spline variables are included in each model where the selection of the spline knots is based on the distribution of the unemployment rate of the states represented in the input data. The spline knots are located at 5.5, 7.8, and 10.3 percent.

Judicial State Indicator:

Lastly, a state legal structure indicator is included to control for variation in state foreclosure laws. The judicial state indicator is set to 1 when the loans are located in the following states: DE, FL, HI, IA, ID, IL, IN, KS, KY, LA, ND, NE, NJ, NM, NY, OH, OK, PA, SC, and SD. In judicial foreclosure states, a lender is required to get a judgment against the borrower and a court order authorizing the sale of the property. The foreclosure timelines in judicial states are longer than in non-judicial states. As such, it is necessary to control for the local legal structures when modeling delinquent loan outcomes.

Credit Loss Module:

The credit loss module 105 projects credit losses on loan balances that are 180+ days delinquent at the beginning of the projection period, and on loan balances that are projected to go to either foreclosure completion (i.e., REO) or to an alternative foreclosure resolution from the Non-Performing Loan Module. The platform 100 projects two accounting measures of loss: Charge-off (e.g., processed from the charge-off module 106) and REO operating expenses (e.g., processed from the REO operating expenses module 107).

Figure 2:
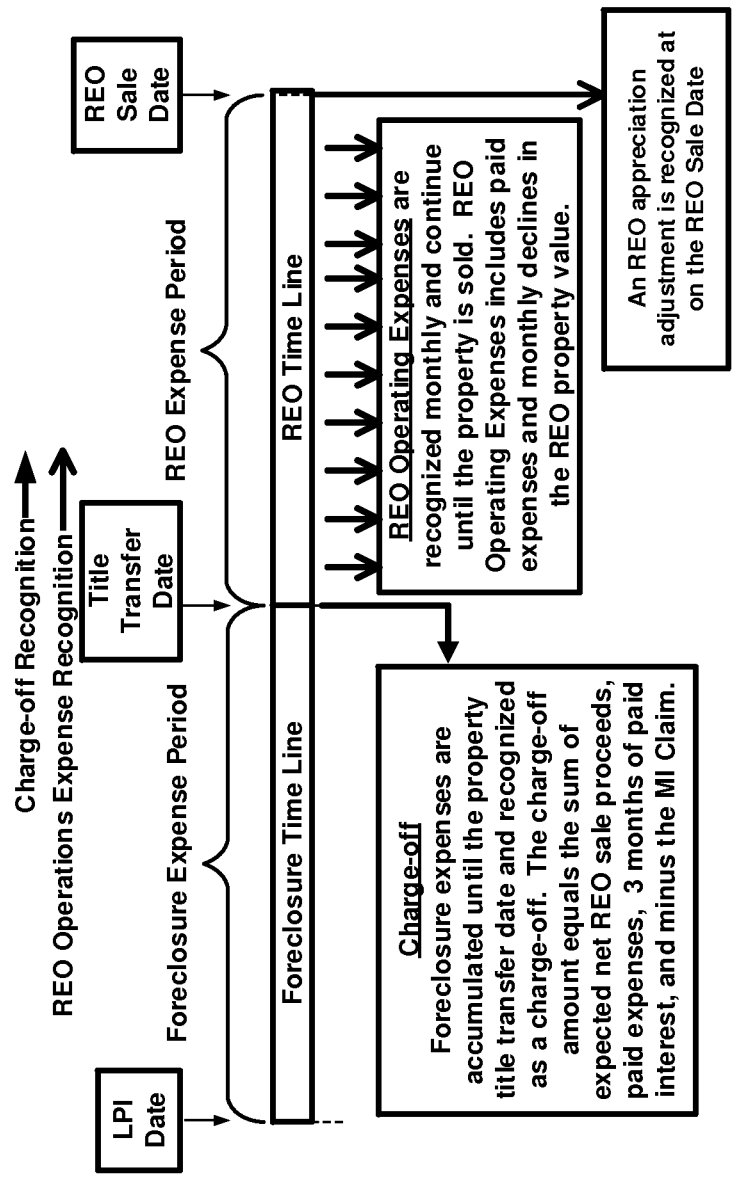
FIG. 2 is a schematic diagram illustrating the differences between charge-offs and REO operating expenses over the delinquency and resolution lifecycle according to an embodiment herein.

FIG. 2, with reference to FIG. 1, schematically separates the differences between charge-offs (as calculated by the charge-off module 106) and REO operating expenses (as calculated by the REO operating expenses module 107) over the delinquency and resolution lifecycle. Expense components included in the charge-off measure are accumulated from the borrower's last paid installment (LPI) date to the date of the title transfer. Two forms of title transfers generate credit losses: foreclosure completions and alternative foreclosure resolutions. Loans that complete the foreclosure process and become REO are charged off at the title transfer date (closed arrow) and begin to generate REO operating expenses thereafter. Meanwhile, loans that terminate via an alternative foreclosure resolution are charged off at the title transfer date (closed arrow); these loans do not become REO and therefore do not generate REO operating expenses. The calculation of charge-offs for both forms of title transfer are identical, while only completed foreclosures generate losses captured in REO operating expense. In contrast to charge-offs, where expenses are accumulated over the foreclosure period and recognized on the title transfer date (closed arrow in FIG. 2), REO operating expenses are calculated and recognized monthly (open arrows in FIG. 1).

Charge-Off Timing:

Non-performing loans are charged off when the property title is transferred at the completion of the foreclosure process or at the culmination of an alternative foreclosure resolution. Alternative foreclosure resolutions include deed-in-lieu of foreclosure, pre-foreclosure sale, and third-party sales. The title-transfer timelines are calculated from historical data as the average number of months to complete the process in each state. The platform 100 includes both a long run timeline and a stressed foreclosure timeline. The stressed timeline represents the average foreclosure timeline for loans that completed the foreclosure process (or alternative foreclosure resolution) during the December 2010 to December 2011 period. The long-run average timelines are calculated from foreclosures (and alternatives) completed from January 1995 to December 2011. Non-performing loans with a level of delinquency greater than the historical state average foreclosure timelines require a special treatment. These loans are assumed to complete foreclosure (or an alternative foreclosure resolution) and be charged off during the first 12 months of the projection. To avoid concentrating all of the charge-offs in a particular month, each of these loans were randomly assigned a charge-off date (based on a uniform distribution) during the first year of the projection.

Charge-Off Amount:

The charge-off amount represents the expected proceeds from the property sale net of all transaction costs, accrued expenses and credit enhancements. The charge-off amount is calculated by module 106 as: ChargeOff=Expected Net REO Sale Proceeds+Paid Expenses+Paid Interest−MI Claim Amount More specifically, the charge-off amount is composed of four components: (1) Expected Net REO Sale Proceeds, (2) Paid Expenses during the Foreclosure Process, (3) Three Months of Lost Interest, and (4) the Mortgage Insurance (MI) Claim Amount. Each of these elements is discussed below.

Expected Net REO Sale Proceeds:

The expected net REO sale proceeds are calculated as: Expected Net REO Sale Proceeds=(UPB*(1+$FC_{Costs}$))−(ReoSalePrice$_{t+k}$*(1−Settlement$_{Costs}$)) where (UPB*(1+$FC_{Costs}$)) represents the unpaid principal balance (UPB) scaled up by the foreclosure cost factor (1+$FC_{Costs}$). The foreclosure cost factor is adapted from the HAMP® Net Present Value (HAMP® NPV) model's state-level averages of "Foreclosure and REO costs" as a percentage of UPB. The HAMP® model documentation is available at: https://www.hmpadmin.com//portal/programs/docs/hamp_servicer/npvmodeldocumentationv 502.pdf. The HAMP® NPV model documentation indicates that these costs are comprised of the following:

Attorney and trustee fees
Possessory and eviction fees and expenses
Bankruptcy expenses
Servicer liquidation expenses
Mortgage insurance (MI) premium
Flood insurance premium
Title insurance
Appraisal fees
Property inspection
Utilities
Property maintenance/preservation
Other foreclosure and holding costs
Total repairs (capped at $3,000 to exclude discretionary repairs)
Participation expenses
Foreclosure costs paid out at property sale (from HUD-1)

These items combine both foreclosure costs (which belong in charge-off) and REO costs (which do not belong in charge-off). To balance out the inclusion of REO cost elements, the "Foreclosure and REO costs" are reduced by half when calculating the charge-off amount. The remaining half is allocated to REO operations expense. The second part of expected net REO sale proceeds (ReoSalePrice$_{t+k}$*(1−Settlement$_{Costs}$)) captures the expected revenue from the sale of the REO property net of brokerage fees and other settlement costs. REO sales price, denoted as ReoSalePrice$_{t+k}$, represents the expected value at time period t given a foreclosure timeline of k months. REO property typically sells at a depressed price relative to a non-distressed transaction. The REO sale price is calculated in two steps to account for the distressed nature of REO property.
1. The original value of the property is "marked forward" by the percentage change in the FHFA state-level purchase-only house price index between loan origination and charge-off date.
2. The "marked forward" value of the house is reduced by a state-level REO stigma correction to account for the price difference that REO property sells for relative to non-REO homes.

While many REO sales are cash transactions, the FHFA state-level purchase-only house price index includes a very small percentage of REO purchase transactions. Therefore, it is preferable to adjust the REO property value in step 1 above by a state-level REO stigma. The REO stigma correction maps the relationship between FHFA state-level purchase-only house price index-based home values to distressed REO sales prices. REO stigma correction follows a modified version of the approach used in the HAMP® NPV model. In contrast to the HAMP® NPV model, where REO Sale prices are regressed on home values generated by an automated valuation model (AVM), the AVM prices are replaced by the property values in step 1 above (home values generated from the FHFA state-level purchase-only home price). An REO stigma equation is estimated for each of the 50 states based on Enterprise data. For all alternative foreclosure resolutions, it is assumed that there is no REO stigma.

The REO Sales price is reduced by settlement costs (1−Settlement$_{Costs}$) as a percentage of the calculated REO disposition sale price, the percentage varies by state. The state-level settlement cost percentages are from the HAMP® NPV model.

Settlement Charges include:
Discount Points
Loan Origination Fees
Broker's Bonus
Broker Commission Fees
Buyer's Closing Costs (paid by seller only—not total buyer's closing costs)
Title Fee Cost
Seller's Closing Costs
Assessments
FHA/VA Non-Allowable Costs
Other Costs
Wire Fees
Subtract miscellaneous revenues received at property sale:
　Per diem amount
　Other rent/interest amount
　Prepaid interest amount
Paid Expenses During the Foreclosure Process:

There are three groups of expenses that are accumulated from the last paid installment to the foreclosure completion (or alternative foreclosure resolution) date: property taxes, property insurance, and maintenance costs. Lookup tables containing the three average expense rates are calculated from American Community Survey (ACS 2010) by location and property value, however other surveys and sources could be used to populate the tables. Apart from homeowners' association fees or condominium fees, maintenance costs on single family homes are not reported in ACS. As a proxy for the monthly maintenance cost on single family homes, it is assumed that the property maintenance costs are equal to one-half the homeowners' association fees that would have been applied if the home had been located in area that required membership in a homeowners' association.

The expense rates are applied to the property value at loan origination and by geographic state to project these periodic expenses in dollars. The periodic expenses are accumulated for every month between LPI date and foreclosure completion date and recognized on the charge-off date.

Paid Interest:
The module 105 assumes that the loan servicer advances the borrower's interest payment to investors for three months, and this amount is reimbursed to the loan servicer by the Enterprise when the loan is purchased out of the security. Three months of interest payments are included as an expense in the charge-off amount.

MI Claim Amount:
For loans with active MI coverage, the MI claim amount is limited to the sum of insured UPB and foreclosure expenses. Foreclosure expenses are equal to the sum of expenses in charge-off and lost interest for all months from the LPI date to foreclosure completion date. As noted above, only three months of lost interest is included in the charge-off measure.

The model assumes that the MI Company will exercise its right to buy the foreclosed property (conveyance) in lieu of paying the MI Claim when the MI payment is greater than the sum of the charge-off and REO operating expenses. In the case of conveyance, the value of the property is based on the FHFA state-level purchase-only HPI at the foreclosure completion date, not at the projected REO sale date. Both the charge-off and REO net expenses attributed to the Enterprise are zero when the MI Company purchases the foreclosed property.

For loans with original LTV greater than 80% and with first pay date on or later than Jul. 29, 1999, that coverage is projected to cancel at the earlier of: (a) the month after the loan's amortization LTV reaches 78 percent, and (b) the month in which the loan's age reaches one half its amortization term. For loans originated before Jul. 29, 1999 where the data indicate that MI coverage is in effect at the beginning of the projection, the coverage is never cancelled.

The calculated MI claim, whether or not the property conveys, is subject to the risk that the MI Company either fails to meet its obligations (e.g. State regulator places the company under regulatory supervision or into receivership), or the MI company denies the claim, or rescinds coverage. To allow for these forms of counterparty credit risk, the module 105 reduces the value of the calculated MI benefit by a haircut percentage. When the platform is run to measure counterparty exposures, the haircut is assumed to be zero, yet when the platform is run to project Enterprise credit losses, the haircut ranges between twenty and twenty-five percent.

For alternative foreclosure resolutions, mortgage insurance is applied in the same way as it is with foreclosed loans. The conveyance calculation is identical to the one used for foreclosure, based on the idea that the MI would not make any payment beyond that which would reduce the Enterprise's loss to zero.

REO Operation Expense Timing:
REO operation expenses are calculated by module 107 and reported one month after foreclosure completion until the REO property is sold. Similar to the foreclosure timings, the platform 100 includes both a long run REO timeline and a stressful timeline. The stressed timeline represents the average state-level timelines for REO properties that were sold between December 2010 and December 2011, a period of economic stress in the residential real estate market. The long-run average timelines are calculated from REO sales completed from January 1995 to December 2011. Both sets of REO sale time lines are computed from Enterprise historical data at the state level.

REO Operation Expense Amount:

REO operations expenses are posted monthly and calculated as the sum of (1) paid expenses and (2) mark-to-market REO property value changes. The REO expenses are the same as the expenses included in the charge-off amount; "Paid Expenses" as described herein and the remaining 50% of the "Foreclosure and REO costs" allocated across the REO holding period. In contrast to the expenses in the charge-off amount, REO operating expenses are recognized each month while the property is held in inventory.

Mark-to-market REO property values enter into the REO operations expense amount in two parts. During the REO holding period, only declines in the value of the REO property are added to the monthly REO operations expenses. Increases in the REO property value are only included in the REO operating expenses when the property is sold. The mark-to-market property values are computed using a projected FHFA state-level purchase-only HPI.

As noted above, if the calculated charge-off excluding the estimated MI payment is negative, both the charge-off and the REO operations expenses that would have been associated with the loan termination are set to zero. It is explicitly assumed that foreclosed or alternative foreclosures cannot generate gains. The best outcome for a non-performing loan is a zero credit loss.

Integration Module:

The module 108 integrates the prepayment and default probabilities from the performing and non-performing modules 103, 104 with the outputs from the credit loss module 105 to project monthly loan-level cash flows. The primary outputs include scheduled and unscheduled principal payments, scheduled interest payments, and losses. Ancillary outputs include servicing fees, guaranty fee revenue, and MI payments. For each mortgage, the unpaid principal balance is projected forward one month by subtracting expected amounts of scheduled, prepaid (unscheduled), and defaulted principal from the performing balance ($UPB_{t-1}$).

$$UPB_{t+1} = UPB_{t-1} - schedPrinPaid_t - prepayDollars_t - dollarsF90ToPrepay_t - dollarsF90ToReo_t - dollarsF90ToSale_t.$$

For expository purposes, the above equation is separated into two parts, (1) scheduled and unscheduled principal, and (2) elements that are subtracted from performing balance that are directed to the credit losses $dollarsF90ToReo_t - dollarsF90ToSale_t$.

Scheduled and Unscheduled Related Principal:

The scheduled and unscheduled principal payments include scheduled paid principal ($schedPrinPaid_t$) net lifetime losses, unscheduled or prepaid principal ($prepayDollars_t$) from performing balances, and unscheduled or prepaid principal from delinquent loans balances ($dollarsF90toPrepay_t$). More specifically, scheduled principal paid is defined as:

$$schedPrinPaid_t = schedPrin_t * (1 - P(lifetimeReo_t | f90_t) - P(lifetimeSale_t | f90_t)).$$

The remaining component $(1 - P(lifetimeReo_t | f90_t) - P(lifetimeSale_t | f90_t))$ represents the portion of the balance related to foreclosure and alternative foreclosure resolution as described with respect to the non-performing module 104 above.

Prepaid dollars on performing loan balances ($prepayDollars_t$) is defined as:

$$prepayDollars_t = P(prepay_t) * (UPB_{t-1} - schedPrin_t),$$

where $P(prepay_t)$ represents the probability of prepayment as defined above with respect to the performing loan module 103. The second term in the prepaid dollars equation, $(UPB_{t-1} - schedPrin_t)$, represents the loan balances at risk of prepaying not of their scheduled principal payment.

The final source of prepaid dollars is from repayments on non-performing loans. There are three components to $dollarsF90ToPrepay_t$: (1) the probability of going 90 days delinquent from the performing loan module 103, (2) the lifetime probability of prepaying given that the balance is delinquent from the non-performing module 104, and (3) the unpaid principal balance at risk.

$$dollarsF90ToPrepay_t = P(f90_t) * P(lifetimePrepay_t | f90_t) * (UPB_{t-1} - schedPrin_t).$$

Credit Loss Related Principal:

Non-performing loan balances resolving as REO or an alternative foreclosure resolution generate lost principal and contribute to the credit loss measures charge-off and REO operating expenses. These two components of principal are subtracted from the performing unpaid principal balance and represent the delinquent loan balances that are later used to calculate charge-offs calculated by the credit loss module 105:

$$dollarsF90ToReo_t = P(f90_t) * P(lifetimeReo_t | f90_t) * UPB_{-1}$$

$$dollarsF90ToSale_t = P(f90_t) * P(lifetimeSale_t | f90_t) * UPB_{t-1}.$$

Credit Loss Measures:

The loan balance projected to go to REO or an alternative foreclosure resolution lead to principal losses and are recognized as charge-offs. The monthly expected values for foreclosure-related charge-offs can be expressed in terms of the charge-off amount calculated by the credit loss module 105:

$$chargeOffDollars_{t+k} = P(f90_t) * P(lifetimeReo_t | f90_t) * chargeOff_{t+k}$$

or, equivalently for both foreclosure complete and alternative foreclosure resolutions:

$$chargeOffDollars_{t+k} = (dollarsF90ToReo_t / UPB_{t-1}) * chargeOff_{t+k}$$

$$chargeOffDollars_{t+k} = (dollarsF90ToSale_t / UPB_{t-1}) * chargeOff_{t+k}$$

where $chargeOff_{t+k}$ is the charge-off amount calculated by the integration module 108, which would be the charge-off amount if the entire loan balance were going to foreclosure, and $chargeOffDollars_{t+k}$ is the charge-off amount scaled to take account of the portion of the balance that is projected to go to foreclosure. The k subscript indicates that the charge-off will be realized following the appropriate foreclosure or alternative foreclosure time line. The logic for REO operating expenses is identical except that the charge-off amount is replaced with the REO Operating expense variable.

Standardized Report Elements:

The platform 100 generates at least one summary report 111 by module 109 containing monthly projections of portfolio performance measures over the forecast horizon. The standard report includes key credit loss elements (charge-offs and REO operation expenses), and many ancillary variables: performing balances, dollars of new 90-day delinquencies, scheduled and unscheduled principal payments, guarantee fee income, and credit enhancement claims.

Custom reports are frequently constructed to meet the needs of new projects, for example, aggregating credit losses by vintage year, credit score group, original LTV, and states. Most custom reports are aggregations of the variables in the standard report. The primary elements in the standardized report are aggregated across the portfolio and posted in the month of recognition:

Forecast Date—each row of the report 111 corresponds to a future month during the forecast horizon for which the dollar amount is recognized.

Performing UPB—is defined above with respect to the integration module 108 and represents aggregate unpaid principal balance in the forecast month that is at risk of defaults and prepayments.

Scheduled Paid Principal—is defined as aggregate scheduled principal paid on performing balances as calculated by the integration module 108.

Unscheduled Paid Principal—is defined as aggregate unscheduled principal paid on performing balances. Unscheduled principal includes prepayments from performing and non-performing loans as calculated by the integration module 108.

Dollars of New 90-day Delinquencies (F90Dollars)—is defined as aggregate newly non-performing loan balances.

Scheduled Interest Net of Fees—is defined as aggregate scheduled interest excluding servicing and guarantee fees on loan balances before non-performing balances are removed.

Paid Interest Net of Fees—is defined as aggregate paid interest on performing loan balances excluding servicing and guarantee fees.

Paid Guarantee Fees—is defined as aggregate paid guarantee fees on performing loan balances.

Non-Performing Lifetime Balances—three variables report the terminal outcome on non-performing balances in the future month in which they are recognized. For example, loan balances projected to resolve as REO in month t will be recognized in a future date when foreclosure is completed.

90 days delinquent balances completing the foreclosure process (REO) is calculated herein as $P(f90_t)*P(\text{lifetimeReo}_t|f90_t)*UPB_{t-1}$.

90 days delinquent balances completing the alternative foreclosure process is calculated herein as $P(f90_t)*P(\text{lifetimeSale}_t|f90_t)*UPB_{t-1}$.

90 days delinquent balances resolving as prepayments is calculated as $P(f90_t)*P(\text{lifetimePrepay}_t|f90_t)*(UPB_{t-}-\text{schedPrin}_t)$.

Credit Loss Measures—As described above, with respect to the credit loss module 105 and integration module 108, the construction and timing of both of the credit loss measures, Charge-Off Dollars and REO Operating Expenses.

Charge-off Subcomponents (as described with respect to the charge-off module 106)—the following components used to calculate charge-off are aggregated across the portfolio and contained in the standard report. These elements are posted in the month of the title transfer (recognition of losses).

Non-performing Balances
Property Value of Non-Performing Loans
Paid Expenses on non-performing loans during the foreclosure process
Three months of paid interest
50% of "Foreclosure and REO costs"
Mortgage insurance claim amount REO Operations Expense Subcomponents (as described with respect to the REO operating expenses module 107)—the follow components used to calculate REO Operating Expenses are aggregated across the portfolio and contained in the standard report. These elements are recognized in the month they occur.

Monthly Paid Expenses & 50% of "Foreclosure and REO costs" on REO Properties
Mark-to-Market REO Property value declines
Mark-to-Market REO Property value increases at REO sale date Spline Construction:

Spline variables are used extensively in the behavioral models, and the general function below is referenced herein. Let $V_i$, $i=1, \ldots, n$, be the spline variables created; $k_i$, $i=1, \ldots, n-1$, be the corresponding spline knot locations; and Var is the variable being splined. Then:

$$V_1 = \min(\text{Var}, k_1)$$

$$V_i = \max[\min(\text{Var}, k_i), k_{i-1}] - k_{i-1} \; i=2, \ldots, n$$

Selection of the spline knot locations is based on the distribution of the variable within estimation data.

Figure 3:
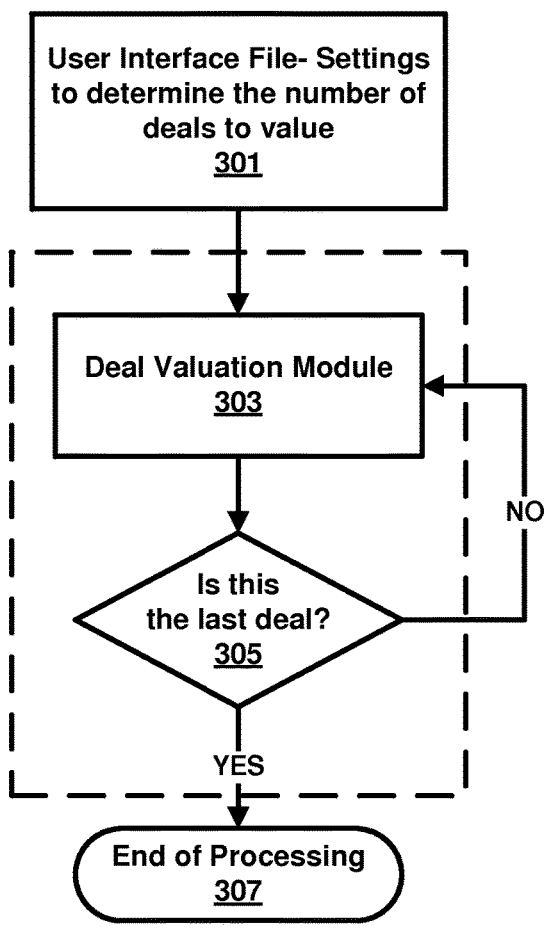
FIG. 3 is a block diagram illustrating a data analytics flow process according to an embodiment herein.

The platform 100 is configured to run a series of processes as further illustrated in the block diagrams of FIGS. 3 through 14. As shown in FIG. 3, a computer user interface file 301 is configured, whereby the user interface is a file that contains the number of deals to run/value and the associate deal names. Deals are run sequentially as specified on the main page of the user interface file 301. Next, a deal valuation module 303 is processed (processing shown in FIG. 4) such that each deal specified in the user interface file 301 is processed in the deal valuation module 303. A signal processing circuit 305 runs a decision step to determine whether the last deal has been specified. If, the last deal has not been specified (No), then the deal valuation module 303 continues its processing. If the last deal has been specified (Yes) by the deal valuation module 303, then a circuit 307 terminates the processing.

Figure 4:
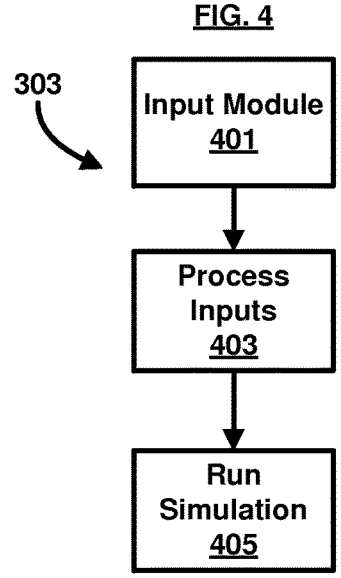
FIG. 4 is a block diagram illustrating the deal valuation module of FIG. 3 according to an embodiment herein.

As shown in FIG. 4, with reference to FIGS. 1 through 3, the deal valuation module 303 includes an input module 401, which reads the user interface file 301 to locate the necessary inputs to value a deal(s). The required inputs include:

Valuation definition—the valuation month, the first projection month, source of economic projections, scenarios of economic projections, number of projection periods, number of simulation paths, cash flow report format;

Economic projections (interest rate, unemployment rate, house prices);

Performing and non-performing loan model parameters;
Credit loss module parameters;
Deal information—Oracle® database schema, database table name, login information, and the local area location to save loan structures, and
Output cash flow and report locations.

Next, a circuit 403 processes inputs by reading, processing, and configuring economic scenarios and parameters, behavioral model parameters, and severity parameters into data objects. The processing by circuit 403 is further shown with respect to FIG. 5.

Again with respect to FIG. 4, a mathematical simulation is run by simulating module 405, which has three primary functions: (1) construct all loan level data objects into data structures; (2) produce cash flow projection data points for each loan (in either parallel or sequential order); and (3) aggregate data cash flows into computerized summary reports. The simulating module 405 is further described with respect to FIG. 6.

The process inputs as run by the processing circuit 403 are described in FIG. 5, with reference to FIGS. 1 through 4. First, an interest rate generator module 501 either builds new interest rate data object structures or loads existing interest rate data object structures (historical and forecasted), or will generate simulated interest rate data object paths internal to the module 501. If a user specifies a multiple path interest rate analysis, the module 501 generates interest rate data object paths based on a stochastic interest rate data object model as further described in FIG. 6.

Again with reference to FIG. 5, a house price generator module 503 either loads existing house price data object structures or builds new data object structures using (HPIs) (historical and forecasted) from object files, or if selected by a user, the module 503 generates simulated house price appreciation data object paths. All HPIs are converted to house price appreciation rates configured as data object structures, and are further illustrated in FIG. 7.

Again with respect to FIG. 5, unemployment rates are loaded from the locations specified in the input module 401 (of FIG. 4) into a data object structure 505. A compiling circuit 507 builds data object structures for all of the data models described with respect to the parameters of the performing loan and non-performing modules 103, 104 (of FIG. 1). A compiling circuit 509 builds data object structures of the parameters in the credit loss module 105 (of FIG. 1).

FIG. 6, with reference to FIGS. 1 through 5, depicts the stochastic interest rate data object model as run by the interest rate generator module 501. In this data object model, historical and market rate or forecasted locations are read/processed by a processing circuit 601. Next, a signal processing circuit 603 determines if the data object structures containing the interest rate data have already been generated. If the rates have already been generated (Yes), then the interest rate data object structures are loaded by the module 501 as a data file 605 for processing, and the module 501 then terminates the processing for generating interest rates by opening an electrical circuit switch 615. If the rates have not already been generated (No), then market and historical interest rates are read/processed or forecasted by processing circuit 607. Next, an interest rate simulator 609 is run to generate simulated interest rates configured as data object structures 611. The simulated interest rates are saved in a hardware-enabled storage device 613, and then the module 501 terminates the processing for generating interest rates by opening the electrical circuit switch 615.

FIG. 7, with reference to FIGS. 1 through 6, illustrates the processing conducted by the house price generator module 503. First, historical and forecasted HPI location data object structures are read/processed by processing circuit 701. Next, a signal processing circuit 703 determines whether the house price appreciation rate (HPA) data object structures are already generated. If the HPA data object structures have already been generated (Yes), then the HPA data object structures are loaded by the module 503 as a data file 705, and the module 503 then terminates the processing for generating house prices by opening an electrical circuit switch 715. If the HPA data object structures have not already been generated (No), then forecasted and historical HPI location data object structures are read/processed by processing circuit 707. Next, a HPA simulator 709 is run to generate HPA data object structures 711, which are saved in a hardware-enabled storage device 713, and then the module 503 terminates the processing for generating house prices by opening the electrical circuit switch 715.

Simulations are run by a simulator module 800 as shown in FIG. 8, and generally require retrieving deal information or data and building loan data object structures. In the context of the embodiments herein, a deal is a portfolio of mortgages saved in object files as selected by a user. A deal could be a set of loan data object structures containing mixed types of mortgage data (fixed rate or adjustable rate mortgage data) with varying maturity data terms, (e.g., from 1 month to 480 months), and multiple data amortization features (e.g., negative amortization, balloon mortgages and interest only mortgages). A deal could also be restricted to an object file containing a set of loans with common features such as seriously delinquent mortgages; or an object file containing a set of loans with MI coverage; or a deal could also include just one loan in the object file.

In an example embodiment, the deals are located in Oracle® database tables. If a deal under analysis is valued for the first time, the module 501 accesses the database table and reads in loans from the table. The module 501 then constructs a loan data object structure for each loan. The loan data object structures are saved to a local storage location.

The purpose of saving the loan data object structures to a local hardware-enabled storage device (e.g., RAM or fast local disk) is to save access time when the deal is valued again. The deal information file specifies whether the requested loan structures are available (i.e., were saved in a prior run). It is common and necessary to reuse loan data object structures, for example, when generating credit loss forecasts for a deal under different economic scenarios. Most deals are run with multiple economic paths including the Federal Reserves' Comprehensive Capital Analysis and Review (CCAR) Baseline, CCAR Adverse, CCAR Severely Adverse, and the FHFA Countercyclical paths. It is much faster to load loan data object structures from a local storage area than to re-load the loans from the database table and rebuild the loan data object structures.

The get deal information and build loan structure data object structure 801 builds loan data object structures based on the specification of the mortgage deal defined by a user in the input module 401 (of FIG. 4). Specific deal information includes the Oracle® database schema, table name, login information, and the local area location to save the loan data object structures. The function also contains additional computations to access the data object structures built in the process input module 401.

Next, model simulation occurs using simulation module 803, which is further described in FIG. 9. First, the number of simulation data object paths are retrieved from a valuation data object structure 901, and the next simulation data object path 903 is determined. Thereafter, a mathematical module 905 is processed, after which a cash flow module 907 is processed. The mathematical module 905 performs calculations and is further illustrated in FIG. 10, and the cash flow module 907 is further illustrated in FIG. 11. Again with respect to FIG. 9, a report and analysis module 909 is run, which causes a circuit 911 to determine whether the simulation data object path is the last data object path. If the data object path is not the last data object path (No), then the next data object path 903 is determined once again. If the data object path is the last data object path (Yes), then a summary report data file 913 is generated.

Figure 10:
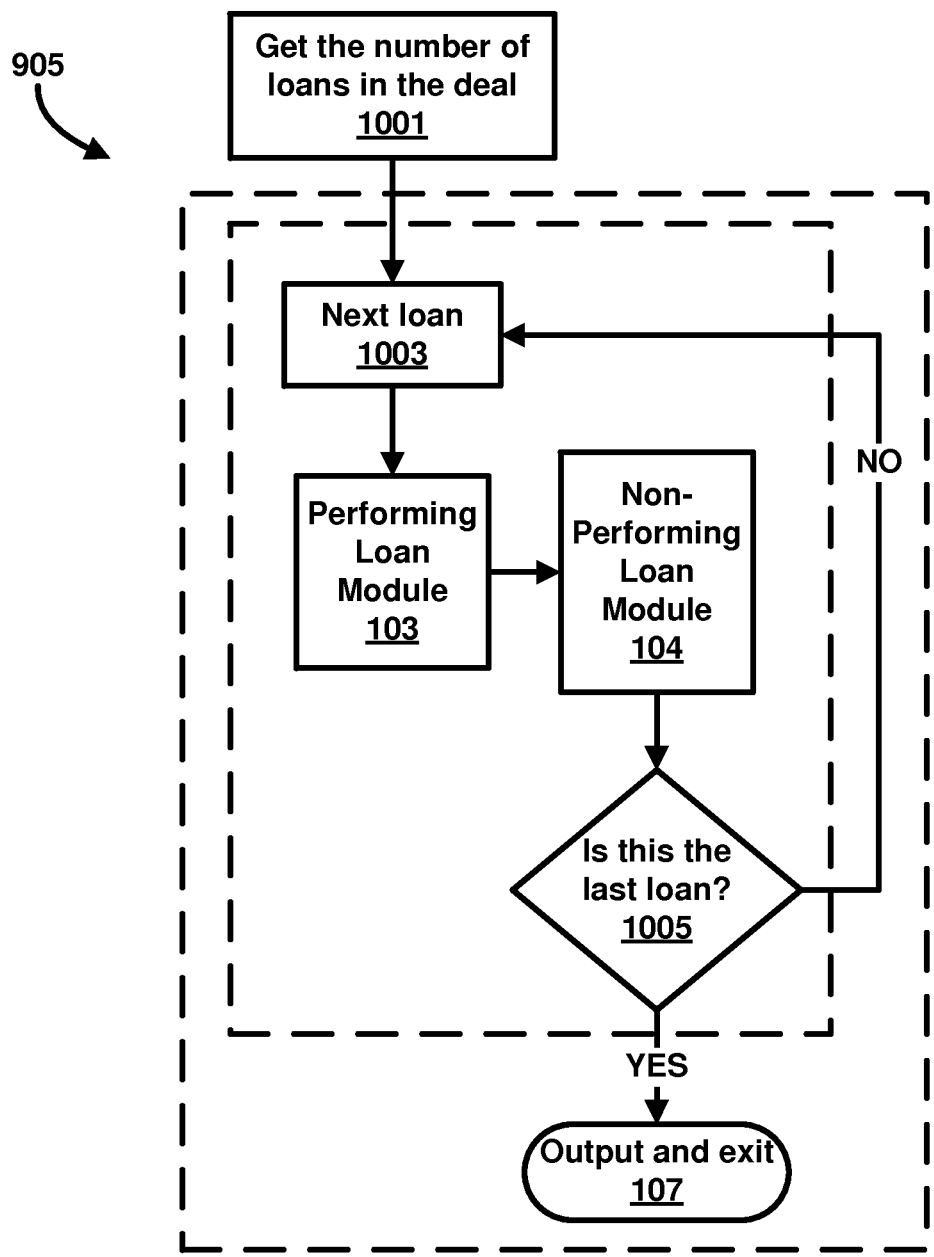
FIG. 10 is a block diagram illustrating the mathematical module of FIG. 9 according to an embodiment herein.

FIG. 10, with respect to FIGS. 1 through 9, illustrates the mathematical module 905 flow processing. First, the number of loans in the deal data object structure 801 is retrieved by module 1001. The next loan for analysis as configured in a loan object file 1003 is retrieved by the module 905. After this, the loan object file 1003 is processed by the performing loan module 103.

Here, the performing loan module 103 calculates delinquency and prepayment probability statistical parameters configured as data object files based on the data models discussed above with reference to the performing loan module 103 of FIG. 1. For each loan in the deal under analysis, the data model calculates prepayment and default probabilities as data object files over the forecasting horizon. For example, if the forecast horizon is 120 months, the module 103 calculates 120 conditional prepayment probabilities and 120 conditional delinquency probabilities based on the loan's attributes and the data model parameters as discussed above. The probability forecasts saved as data object files are conditional on the independent variables discussed above, for example, loan characteristics (age, loan product, origination characteristics) and the economic projections (interest rate, unemployment rate, house prices).

Next, the loan object file 1003 is processed by the non-performing loan module 104, which calculates delinquency to final resolution probability statistical parameters configured as data object files based on the data models discussed above with reference to the non-performing module 104 of FIG. 1. The data model calculates, for each loan over the forecast horizon, the lifetime probability statistical calculations configured as data object files of delinquent loans resolving as REO, pre-foreclosure sale, prepayment, and recovery status.

Next, circuit 1005 determines if the current loan under analysis saved in a data object file is the last loan to be analyzed by the module 905. If the current loan is not the last loan to be analyzed (No), then the next loan object file 1003 sequentially saved in the deal data object structure 801 is retrieved. If the current loan is the last loan to be analyzed (Yes), then the module 905 terminates the mathematical processing by opening the electrical circuit switch 107 and generating an output signal.

FIG. 11, with reference to FIGS. 1 through 10, depicts the cash flow module 907 in further detail. First, the number of loans in the deal data object structure 801 is retrieved by module 1101. The next loan for analysis as configured in a loan object file 1103 is retrieved by the module 907. Next, an amortization module 1105 processes the data structures associated with four types of amortization methodologies: fixed rate amortization, adjustable rate amortization, step rate amortization (for modified loans), and loans with a negative amortization feature. Loan balances are amortized based on the loan's product type.

Then, a cash flow projection module 1107 sequentially calculates several current period cash flows based on the prior period's performing loan balance. The following amounts are calculated in a data object file: this period's performing unpaid principal balance, schedule principal payment, unscheduled principal payment (prepaid dollars), interest payment, delinquent dollar, final status of non-performing loan balances, and end of period performing unpaid principal balance.

Next, the credit loss module 105 calculates credit losses based on non-performing dollars that are projected to transition from delinquency status to REO, and from delinquency status to pre-foreclosure sale. Both the dollar amount and timing of charge-offs (e.g., processed by module 106 in FIG. 1) and REO operating expenses (e.g., processed by module 107 in FIG. 1) are calculated by module 105 as further described above with reference to FIG. 1.

Again with reference to FIG. 11, the cash flow integration module 1109 integrates the cash flows from the amortization module 1105, cash flow projection module 1107, and the credit loss module 105. Next, circuit 1111 determines if the current loan under analysis saved in a data object file is the last loan to be analyzed by the module 907. If the current loan is not the last loan to be analyzed (No), then the next loan object file 1103 sequentially saved in the deal data object structure 801 is retrieved. If the current loan is the last loan to be analyzed (Yes), then the module 907 creates an electronic report and data analysis summary. The report module 1113 aggregates credit loss cash flows and outputs the summaries after each path as a data object file. Several different types of electronically-generated and configured reports are supported in the module 1113. Multiple predefined electronic reports are available in either single or multiple dimensions. The summary data object file contains data structures containing aggregated average credit losses, and distributions of credit losses if multiple paths are run.

FIG. 12, with reference to FIGS. 1 through 11, further illustrates the processing performed by the credit loss module 105. First, the credit loss module 105 projects credit losses on loan balances that are 90+ days delinquent at the beginning of the projection period, and on loan balances that are projected to go to either foreclosure completion (i.e., REO) or to an alternative foreclosure resolution from the non-performing loan module 104 (of FIG. 1). The platform 100 of FIG. 1 projects two accounting measures of loss: charge-off and REO operating expenses, as processed by modules 106, 107, respectively.

In FIG. 12, with reference to FIGS. 1 through 11, the credit loss module 105 includes a processing module 1201 to calculate the loss projection by REO (which is further described in FIG. 13), a processing module 1203 to calculate the loss projection by a pre-foreclosure sale (which is further described in FIG. 14), and a processing module 1205 to calculate the aggregate credit loss cash flows. Processing module 1201 is configured to receive logic instructions from module 106 to calculate the charge-off amount. The processing module 1201 is also configured to receive logic instructions from module 107 to calculate the REO operating expenses, and to estimate MI payments to a policy benefactor if MI coverage exists. Processing module 1203 is configured to receive logic instructions from module 106 to calculate the charge-off amount, and is configured to receive logic instructions from module 107 to estimate MI payments to a policy benefactor if MI coverage exists. Processing module 1205 is configured to aggregate the credit losses from both the REO losses and pre-foreclosure sale losses into a final loss cash flow metric saved as an object data structure in a data file.

Figure 13:
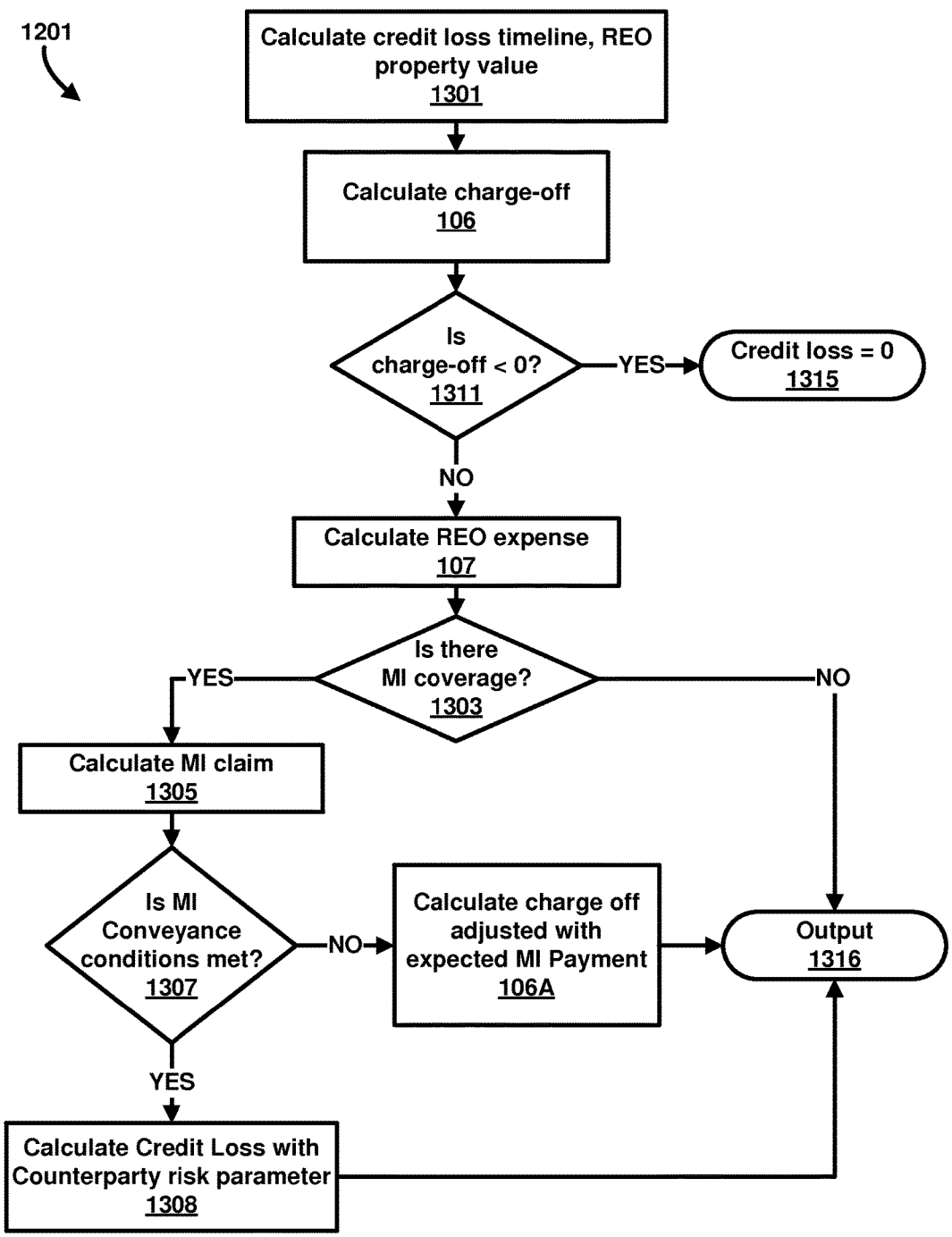
FIG. 13 is a block diagram illustrating the processing module to calculate the loss projection by REO of FIG. 12 according to an embodiment herein.

FIG. 13, with reference to FIGS. 1 through 12, illustrates the loss projections by REO calculated by the processing module 1201. Here, module 1201 calculates, for each forecast month, the dollar amount of credit losses for loan balances that are projected to resolve as REO. First, the module 1201 calculates the credit loss timeline and the REO property value saved as object data structures 1301. More specifically, the module 1201 finds the geographic location of the home (i.e., city and state) associated with a particular mortgage using global positing system (GPS) data retrieval processing, and assigns the location specific severity model data object parameters to the loan object file. These data parameters include:

(1) Mark-to-Market (MTM) property value 'stigma' code. The 'stigma' code represents a distressed house price discount code applied to REO property sales.

(2) MTM property settlement cost ratio code (settlement charges as a percent of sales price).

(3) Foreclosure and REO cost code as a percent to the unpaid principal balance (UPB) value associated with a mortgage.

(4) Number of months from the last paid installment (LPI) date to the foreclose date.

(5) Number of months from the foreclosure date to the final disposition (REO sale) date.

Then, for each forecast month, the module 1201 calculates the number of months to foreclosure using the geographic specific foreclosure timelines, calculates the REO to UPB ratio which is defined as the forecasted REO dollars to the beginning of the month performing UPB. The forecasted REO dollars are defined as delinquency dollars that are projected to resolve as an REO. The module 1201 also calculates the MTM value of the property at the foreclosure month, using the MTM property value 'stigma' code, and also calculates the monthly property taxes, homeowners' association fees (or condominium dues), and property insurance expenses.

Next, REO charge-off is calculated by module 106. For the projection month, the charge-off amount is a numeric figure represented by a binary code readable by module 106 and equals the REO to UPB ratio multiplied by: the sum of the [UPB at the beginning of the projection month], the [One Half of Foreclosure and REO cost to UPB], the [Three months of scheduled interest (from amortization module 1105 of FIG. 11)], and the [monthly taxes, HOA, property insurance expenses from LPI date to the foreclosure date] less [MTM property value less settlement cost at month of foreclosure].

If the result of the above calculation of the charge-off amount is negative (Yes) as determined by processing circuit 1311, then the losses (charge-off and REO operating expense) are zero for the projection month (e.g., credit loss=0) and the process stops by opening switch 1315. Otherwise (No), the process continues to next step of calculating the REO operating expense using module 107.

To calculate the REO operating expense, for each month from the month after the foreclosure date to the month of final disposition, module 107 performs the following processes:

(1) Calculates the monthly property taxes, HOA dues, and property insurance expenses.

(2) Calculates one half of the foreclosure and REO cost, allocated uniformly to each month between the first month after the foreclosure date to the disposition date.

(3) Calculates additional losses due to declines in house prices. For each month from the foreclosure date to the disposition date, the MTM property values (less settlement costs) is calculated. The value at the foreclosure month is recorded as an initial recorded minimum value. If the MTM property value declines from one month to the next, and if this value is lower than the recorded minimum, then this decline (the difference between the minimum and the MTM property value (less settlement)) is reported as a REO operating expense. A new minimum is then recorded. The monthly REO operating expenses due to house price declines are reported monthly, and successive declines are reported on a marginal basis.

(4) Calculates the difference between [the MTM property value at month of disposition (less settlement cost)] and [the MTM property value at month of foreclosure (less settlement cost)], if this amount is larger than 0, record this amount, otherwise, record 0.

The monthly REO operating expenses are a numeric figure represented by a binary code readable by module 107 and equals the sum of (1) to (3) less (4), multiplied by the REO to UPB ratio for the projection month. The module 107 outputs the following data object parameters: charge-off dollars, REO operating expenses, and MI payments to the benefactor of the policy.

Next, the module 1201 determines whether MI coverage exists using a processing circuit 1303. If MI coverage does not exist (No), then the charge-off amount is calculated in module 106 and output by processing circuit 1316. If MI coverage exists (Yes), then module 1305 calculates the MI payments to the MI policy benefactor. More specifically, module 1305 determines if there is MI coverage at the beginning of the forecast period, and whether the loan is covered by mortgage insurance in the current projection month. If the MI coverage ratio (given in the loan data object structure) for the mortgage is greater than zero, the mortgage has MI coverage at time zero. If the mortgage has MI coverage at time zero (beginning of the forecast) and is not delinquent, the module 1305 determines, for each subsequent month, if the MI will be in effect. MI is canceled when the loan's amortized loan-to-value ratio is equal to or less than seventy-eight percent and the loan is not delinquent or the loan is older than half of the amortization term.

The module 1305 also calculates a MI raw claim for each projection period in which MI coverage exists and the MI is not cancelled. The MI payment paid to the benefactor of the insurance is calculated as the product of the "MI raw claim" and the MI coverage ratio. The MI raw claim comprises the following data components:

(1) UPB at the beginning of projection month.

(2) One half of the foreclosure and REO costs (the other half will be allocated to operating expense).

(3) Scheduled interest payments (calculated from the loan amortization) multiplied by the number of months from LPI to the foreclosure date.

(4) The sum of the monthly property taxes, homeowners' association fees (or condominium dues), and property insurance expenses multiplied by the number of months from LPI to foreclosure date.

The MI raw claim is a numeric figure represented by a binary code readable by module 1305 and is equal to the sum of the above components multiplied by the REO to UPB ratio.

Next, processing circuit 1307 determines if a MI conveyance exists, whereby for each projection period, if the MI is not cancelled, the processing circuit 1307 calculates if the MI will convey. MI conveyance includes:

(1) UPB at the beginning of the projection month.

(2) 100% of foreclosure and REO cost to UPB.

(3) Three months of scheduled interest (from amortization module 1105 of FIG. 11)

(4) The sum of the monthly property taxes, homeowners' association fees (or condominium dues), and property insurance expenses multiplied by the number of months from LPI to the final disposition date.

(5) MTM property value less settlement costs.

The MI conveyance is a numeric figure represented by a binary code readable by processing circuit 1305 and equals the sum of components (1) to (4), less component (5), and then multiplied by the REO to UPB ratio.

If the MI estimated payment to the MI policy benefactor is larger than the MI conveyance amount (Yes), then the credit loss (charge-off and the associated REO operating expenses) are calculated, in module 1308, as MI haircut percent (a counterparty risk parameter) multiplied by credit loss (charge-off and associated REO operating expenses) calculated in module 106 and 107. The MI estimate is calculated as 1–MI haircut percent multiplied by the credit loss. The calculation is then output by processing circuit 1316. Otherwise (No), the REO charge-off is calculated by module 106A. For the projection month, the charge-off amount is a numeric figure represented by a binary code calculated by module 106 less [MI estimated payment to the policy benefactor multiplied by 1 less the MI haircut (MI raw claim*MI coverage ratio*(1—MI haircut), or zero if no MI coverage or MI is cancelled]. The results are output by processing circuit 1316.

Figure 14:
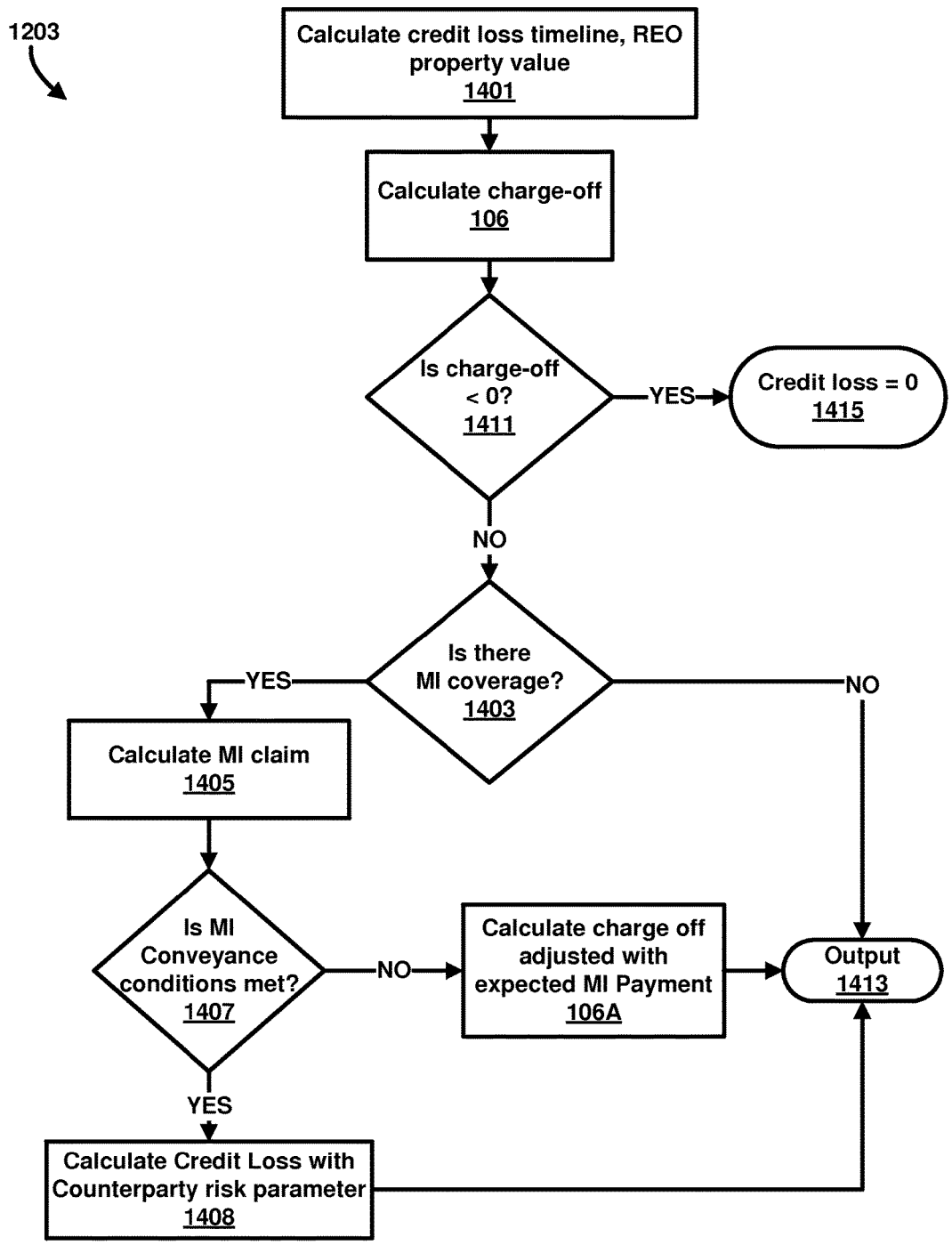
FIG. 14 is a block diagram illustrating the processing module to calculate the loss projection by a pre-foreclosure sale of FIG. 12 according to an embodiment herein.

FIG. 14, with reference to FIGS. 1 through 13, illustrates the loss projection by pre-foreclosure sale by processing module 1203. Here, module 1203 calculates, for each projection period, the credit losses for loan balances that are projected to go to pre-foreclosure sale (PFS) saved as object data structures 1401. Generally, module 1203 calculates the credit loss timeline and MTM property value. More specifically, the module 1203 finds the geographic location of the home (i.e., city and state) associated with a particular mortgage using GPS data retrieval processing, and assigns the location specific severity model data object parameters to the loan object file. These data parameters include:

(1) MTM property value 'stigma' code. The 'stigma' code represents a distressed house price discount code applied to REO property sales.

(2) MTM property settlement cost ratio code (settlement charges as percent to sales price).

(3) Number of months from the last paid installment (LPI) date to the pre-foreclosure sale date.

Then, for each projection month, the module 1203 calculates the number of months to PFS using the geographic specific foreclosure timelines, calculates the PFS to UPB ratio which is defined as the forecasted PFS dollars to the beginning of the month performing UPB. The forecasted PFS dollars are defined as delinquency dollars that are projected to resolve as PFS. The module 1203 also calculates the MTM value at the pre-foreclosure month, using the MTM property value 'stigma' code, and also calculates the monthly property taxes, homeowners' association fees (or condominium dues), and property insurance expenses.

Next, the PFS charge-off is calculated by module 106. For the projection month, the charge-off amount is a numeric figure represented by a binary code readable by module 106 and equals the PFS to UPB ratio multiplied by: the sum of the [UPB at the beginning of the projection month], the [Three months of scheduled interest (from amortization module 1105 of FIG. 11)], and the [monthly taxes, HOA, property insurance expenses from LPI date to the pre-foreclosure sale date], less [MTM property value less settlement cost at month of pre-foreclosure sale].

If the result of the above calculation of the charge-off amount is negative (Yes) as determined by processing circuit 1411, then the losses (charge-off) are zero for the projection month (e.g., credit loss=0) and the process stops by opening switch 1415. Otherwise (No), the module 1203 determines whether MI coverage exists using a processing circuit 1403. If MI coverage does not exist (No), then the charge-off calculated in module 106 and is outputted by processing circuit 1413. If MI coverage exists (Yes), then module 1405 calculates the MI payments to the MI policy benefactor.

More specifically, module 1405 determines if there is MI coverage at the beginning of the forecast period, and whether the loan is covered by mortgage insurance in the current projection month. If the MI coverage ratio (given in the loan data object structure) for the mortgage is greater than zero, the mortgage has MI coverage at time zero. If the mortgage has MI coverage at time zero (beginning of the forecast) and is not delinquent, the module 1405 determines, for each subsequent month, if the MI will be in effect. The MI is cancelled when the loan's amortized loan-to-value ratio is equal to or less than seventy-eight percent and the loan is not delinquent or the loan is older than half of the amortization term.

The module 1405 also calculates a MI raw claim for each projection period in which MI coverage exists and the MI is not cancelled. The MI payment paid to the benefactor of the insurance is calculated as the product of the "MI raw claim" and the MI coverage ratio. The MI raw claim comprises the following data components:

(1) UPB at the beginning of projection month.

(2) Scheduled interest payments (calculated from the loan amortization) multiplied by the number of months from LPI to the pre-foreclosure sale date.

(3) Monthly property taxes, homeowners' association fees (or condominium dues), and property insurance expenses multiplied by the number of months from LPI to the pre-foreclosure sale date.

The MI raw claim is a numeric figure represented by a binary code readable by module 1405 and is equal to the sum of the above components multiplied by the PFS to UPB ratio.

Next, processing circuit 1407 determines if a MI conveyance exists, whereby for each projection period, if the MI is not cancelled, the processing circuit 1407 calculates if the MI will convey. MI conveyance includes:

(1) UPB at the beginning of the projection month.

(2) Three months of scheduled interest (from amortization module 1105 of FIG. 11).

(3) Monthly property taxes, homeowners' association fees (or condominium dues), and property insurance expenses multiplied by the number of months from LPI to the pre-foreclosure sale date.

(4) MTM property value less settlement costs.

The MI conveyance is a numeric figure represented by a binary code readable by processing circuit 1405 and equals the sum of components (1) to (3), less component (4), and then multiplied by the PFS to UPB ratio.

If the MI estimated payment to the MI policy benefactor is larger than the MI conveyance amount (Yes), then the charge-off and the expected MI payment for the projection month are calculated in module 1408. The charge-off is calculated as MI haircut percent (a counterparty risk parameter) multiplied by the charge-off calculated in module 106 above. MI estimate is calculated as 1–MI haircut percent multiplied by the charge-off calculated in module 106 above. The calculation is then output by processing circuit 1413. Otherwise (No), the PFS charge-off is calculated by module 106A. It is the amount of charge-off calculated in module 106 adjusted with expected MI payment. For the projection month, the charge-off amount is a numeric figure represented by a binary code readable by module 106 less MI estimated payment to the policy benefactor after the MI haircut [MI raw claim*MI coverage ratio*(1–MI haircut), or zero if no MI coverage or MI is cancelled].

If the result of the above calculation of the charge-off amount is negative (Yes) as determined by processing circuit 1411, then the losses (charge-off) are zero for the projection month (e.g., credit loss=0) and the process stops by opening switch 1415. Otherwise (No), an output of the module 1203 is generated by processing circuit 1413, wherein the output is the charge-off amount and the MI payments.

The embodiments herein improve various other technologies and technological fields including, but not limited to:

(1) Constructing data analytics information and/or decision technology systems for calculating the capital requirements for portfolios of single family mortgages;

(2) Constructing data analytics information and/or decision technology systems for designing and testing of national housing finance policies;

(3) Constructing data analytics information and/or decision technology systems for calculating the credit component of single family guarantee fees;

(4) Constructing data analytics information and/or decision technology systems for calculating the risk-based required asset amount factor tables which are used to calculate the risk-based required asset amounts for private mortgage insurance;

(5) Constructing data analytics information and/or decision technology systems for calculating the credit risk and prepayment risk of a particular loan, loan pool, or mortgage-related product;

(6) Constructing data analytics information and/or decision technology systems for calculating damages for lawsuits;

(7) Constructing data analytics information and/or decision technology systems for calculating single family mortgage credit losses to the Enterprises based on multiple economic scenarios (e.g. annual Dodd-Frank Act Stress Testing);

(8) Constructing data analytics information and/or decision technology systems for calculating the amount of credit risk transferred by the Enterprises' credit risk transfer securities and agreements based on multiple economic scenarios;

(9) Constructing data analytics information and/or decision technology systems for calculating the value of credit loss sharing agreements based on multiple economic scenarios;

(10) Constructing data analytics information and/or decision technology systems for mortgage insurance risk sharing transactions;

(11) Constructing data analytics information and/or decision technology systems for forecasting prepayment risk, which is the primary risk faced by investors in the Enterprises' mortgage securities;

(12) Constructing data analytics information and/or decision technology systems for forecasting credit risk, which is the primary risk faced by the Enterprises, investors in Enterprise Credit Risk Transfer securities and faced by banks that hold whole loan mortgages;

(13) Constructing data analytics information and/or decision technology systems for determining portfolio and risk management decisions (hold verse sell) regarding whole loans, mortgage securities, or entire loan portfolios; and

(14) Constructing data analytics information and/or decision technology systems for forecasting the amount and timing of mortgage related charge-offs and REO operating expenses under alternative economic scenarios.

The embodiments herein may be embodied as a computer program product configured to include a pre-configured set of instructions stored in non-volatile memory, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 15:
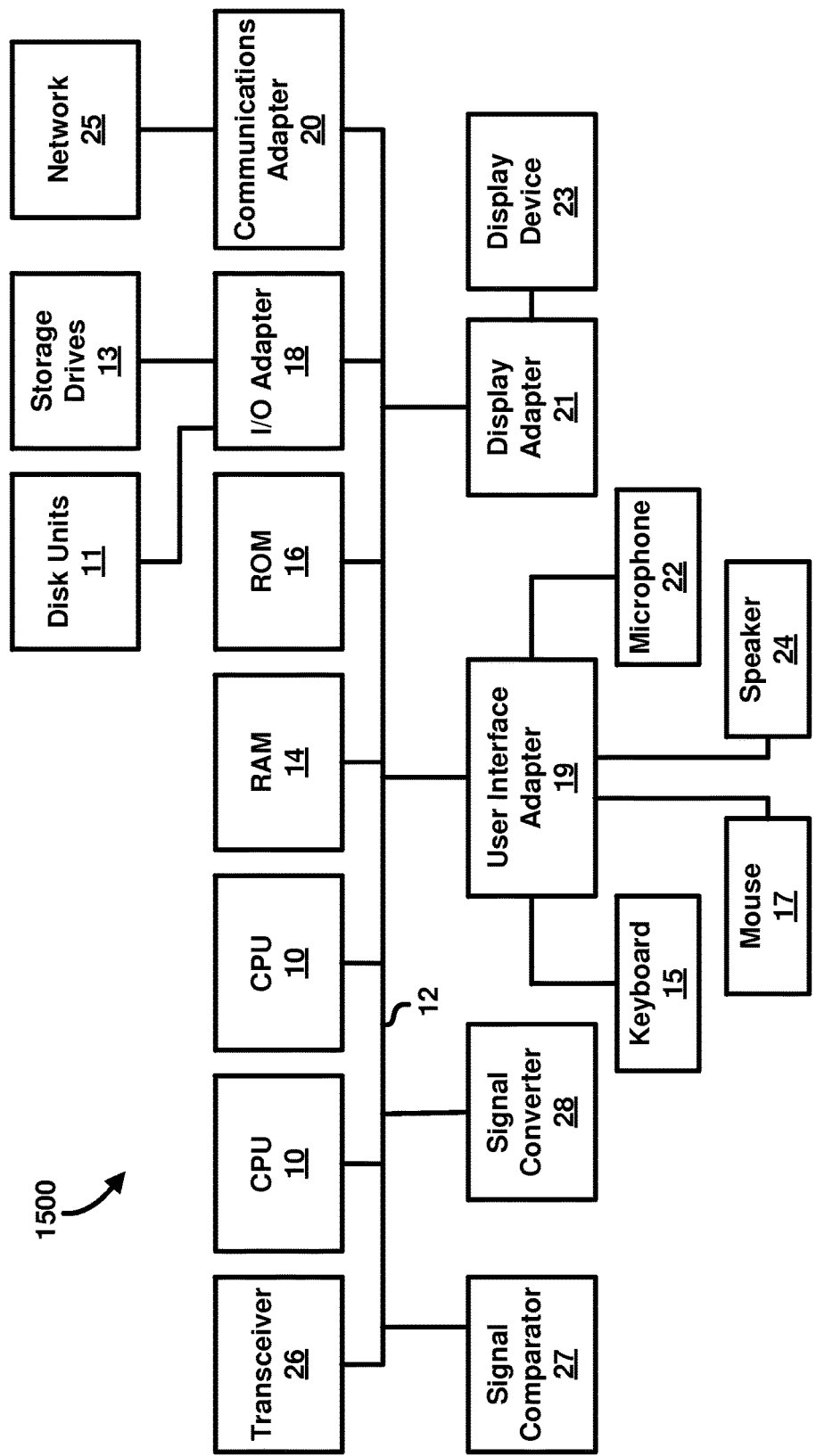
FIG. 15 is a block diagram illustrating an exemplary embodiment of a computer architecture used in accordance with the embodiments herein.

A representative hardware environment for practicing the embodiments herein is depicted in FIG. 15, with reference to FIGS. 1 through 14. This schematic drawing illustrates a hardware configuration of an information handling/computer system 1500 in accordance with an exemplary embodiment herein. The system 1500 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and storage drives 13, or other program storage devices that are readable by the system. The system 1500 can read the inventive instructions on the program storage devices and follow these instructions to execute the methodology of the embodiments herein. The system 1500 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

In an example, the various modules and circuits described above with respect to the embodiments herein may generate an electric signal that may include data pertinent to the relevant entity (e.g., data structures, object files, etc.) and the electric signals may be transmitted to the display device 23 to be displayed thereon. For example, the plurality of pixels may be displayed on the display device 23 in a format presenting the various electronic reports 111. Moreover, the value of the pixels can be changed to more particularly highlight the data presented in the electronic reports 111.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A data analytics platform system comprising:
a first computer database comprising economic forecast data object structures, house pricing data object structures, unemployment data object structures, and interest rate data object structures;
a second computer database comprising a plurality of data object structures associated with attributes of mortgage loans and attributes of borrowers of said mortgage loans, wherein the second computer database is stored in a local hardware-enabled storage device to store said plurality of data object structures to reduce data access time for reusing said plurality of data object structures for subsequent retrieval of said plurality of data object structures under different economic scenarios;
a processor communicatively linked to the first and second computer databases;
a transceiver to transceive electric digital signals containing the data object structures between the processor and the first and second computer databases;
a first computer module containing a first electronic circuit that processes a first set of computer logic instructions, wherein said first computer module is communicatively connected to an output of said first computer database, wherein said first set of computer logic instructions creates data analytical projections for predicting a monthly status on performing and modified performing mortgage loans by inputting digital signals containing a first digital packet of structured data comprising projected probabilities of termination to performing loan balances into said processor and performing sequential calculations of said projected probabilities to determine whether the loans are considered to be prepaying or defaulting, and wherein said monthly status comprises whether the mortgage loans are current, prepaid, or delinquent;

a second computer module containing a second electronic circuit that processes a second set of computer logic instructions, wherein said second computer module is communicatively connected to each of an output of said first computer database and an output of said first computer module, and wherein said second set of computer logic instructions creates data analytical projections of lifetime outcomes for delinquent mortgage loans by inputting digital signals containing a second digital packet of structured data comprising loan data into said processor and performing four mutually exclusive loan-specific probability calculations over a predetermined forecast period;

a third computer module containing a third electronic circuit that processes a third set of computer logic instructions, wherein said third computer module is communicatively connected to an output of said first computer database, and wherein said third set of computer logic instructions creates data analytical calculations of mortgage loan level credit losses and timing parameters of loan loss recognition attributes by inputting digital signals containing a third digital packet of structured data comprising said loan data into said processor, performing a projected calculation of charge-off expenses and real estate owned (REO) expenses related to the mortgage loans, and projecting credit losses by measuring the charge-off expenses and REO expenses over a predetermined delinquent loan lifecycle;

a fourth computer module containing a fourth electronic circuit that processes a fourth set of computer logic instructions, wherein said fourth computer module is communicatively connected to an output of each of said first computer module, said second computer module, and said third computer module, and wherein said fourth set of computer logic instructions creates data analytical calculations of forecasted mortgage loan performance attributes, mortgage loan contract terms, and interest rates to generate mortgage loan level cash flow data analytics by inputting digital signals containing a fourth digital packet of structured data comprising said loan data into said processor and aggregating outputs from the first, second, and third computer modules to project monthly loan-level cash flows associated with the mortgage loans;

a fifth computer module containing a fifth electronic circuit that processes a fifth set of computer logic instructions, wherein said fifth computer module is communicatively connected to an output of said fourth computer module, and wherein said fifth set of computer logic instructions summarizes projections of data performance analytics over a predetermined forecasted period of time, and creates an electronic summary report of said projections by inputting digital signals containing a fifth digital packet of structured data comprising said loan data into said processor, receiving the aggregated output from said fourth computer module, and compiling said aggregated output into said electronic summary report;

an electric signal generator embedded in an electronic circuit and communicatively and operatively connected with the first, second, third, fourth, and fifth computer modules for generating the electric digital signals comprising data associated with said electronic summary report of said projections;

a signal converter for converting said electric digital signals into a plurality of pixels; and a display device for displaying said plurality of pixels, wherein said display device arranges said plurality of pixels into said electronic summary report of projections in a selected manner by changing a value of said plurality of pixels displayed on the display device to change the presentation of particular data in said electronic summary report.

2. The system of claim 1, wherein said projections comprise mortgage performance from a current age of said mortgage loan to termination, including foreclosure alternatives and a resolution of real estate owned (REO), and wherein said projections are configured as data structures comprising statistical probabilities of termination to performing loan balances.

3. The system of claim 1, further comprising a sixth computer module containing a sixth electronic circuit that processes a sixth set of computer logic instructions, wherein said sixth computer module is communicatively connected to an output of said first computer database, and an input of each of the first, second, and third computer modules, and wherein said sixth set of computer logic instructions provide a status of a mortgage loan including any of whether a loan is performing, non-performing, undergoing prepayment, and in default.

4. The system of claim 1, wherein said third computer module comprises:
a first sub-computer module containing a first sub-electronic circuit that processes a first sub-set of computer logic instructions, wherein said first sub-computer module is communicatively connected to an output of said second computer module, wherein said first sub-set of computer logic instructions determine a charge-off amount comprising mortgage loan foreclosure expenses that are accumulated until a date of title transfer of a property associated with the mortgage loan, and wherein said charge-off amount equals a sum of expected net real estate owned (REO) sale proceeds, paid expenses, and three months of paid interest less a mortgage insurance claim amount; and
a second sub-computer module containing a second sub-electronic circuit that processes a second sub-set of computer logic instructions, wherein said second sub-computer module is communicatively connected to an output of said first sub-computer module, and wherein said second sub-set of computer logic instructions determine a REO operating expenses amount comprising paid expenses and monthly declines in a REO property value of said property.

5. The system of claim 1, further comprising a deal valuation computer module containing an electronic circuit that processes a set of computer logic instructions, said deal valuation computer module comprising:
an input computer module containing an electronic circuit that processes a set of computer logic instructions for processing a user interface file that determines the number of mortgage deals to be evaluated;
an electronic processing circuit that processes a set of computer logic instructions for reading, processing, and configuring economic scenarios and parameters, behavioral model parameters, and severity parameters and configuring the parameters into data objects; and a simulating computer module containing an electronic circuit that processes a set of computer logic instructions for constructing all loan level data objects into data structures; producing cash flow projection data points for each loan; and aggregating data cash flows into computerized summary reports.

6. The system of claim 5, wherein said electronic processing circuit comprises:
an interest rate generator computer module that processes a set of computer logic instructions for building new interest rate data object structures or loads existing interest rate data object structures, or generating simulated interest rate data object paths internal to said interest rate generator computer module; and
a house price generator computer module that processes a set of computer logic instructions for loading existing house price data object structures or building new data object structures using house price indexes from object files, or generating simulated house price appreciation data object paths.

7. The system of claim 6, wherein said interest rate generator computer module processes a set of computer logic instructions comprising:
reading historical and market rate or forecasted locations using a first processing circuit; and
determining, using a signal processing circuit, whether data object structures containing interest rate data have already been generated by said interest rate generator computer module.

8. The system of claim 7, wherein said interest rate generator computer module processes a set of computer logic instructions comprising loading the interest rate data object structures as a data file for processing by said interest rate generator computer module.

9. The system of claim 7, wherein said interest rate generator computer module processes a set of computer logic instructions comprising:
reading market and historical interest rates using a second processing circuit;
generating simulated interest rates configured as data object structures; and
storing said simulated interest rates in a hardware-enabled storage device.

10. The system of claim 6, wherein said house price generator computer module processes a set of computer logic instructions comprising:
reading historical and forecasted house price index location data object structures using a first processing circuit; and
determining, using a signal processing circuit, whether house price appreciation rate (HPA) data object structures have already been generated by said house price generator computer module.

11. The system of claim 10, wherein said house price generator computer module processes a set of computer logic instructions comprising loading said HPA data object structures as a data file for processing by said house price generator computer module.

12. The system of claim 10, wherein said house price generator computer module processes a set of computer logic instructions comprising:
reading forecasted and historical house price index location data object structures using a second processing circuit;
generating HPA data object structures; and
storing said HPA data object structures in a hardware-enabled storage device.

13. The system of claim 1, further comprising a simulator computer module that processes a set of computer logic instructions comprising:
retrieving deal data that comprises data of a portfolio of various mortgage loans saved in object files;
building loan data object structures;
saving said loan data object structures in a local hardware-enabled storage device; and
performing at least one model simulation based on the saved loan data object structures using a simulation module that processes a set of computer logic instructions.

14. The system of claim 13, wherein said simulation module processes a set of computer logic instructions comprising:
retrieving a number of simulation data object paths from said loan data object structures;
determining a next simulation data object path;
performing mathematical calculations of the simulated data object path using a mathematical computer module that processes a set of computer logic instructions;
processing a cash flow computer module that processes a set of computer logic instructions;
running a report and analysis computer module that processes a set of computer logic instructions; and
determining whether the simulated data object path is a last data object path to be simulated.

15. The system of claim 14, wherein said mathematical computer module processes a set of computer logic instructions comprising:
retrieving a number of loans in a deal data object structure;
calculating delinquency and prepayment probability statistical parameters configured as data object files based on data models established by said first computer module;
calculating delinquency to final resolution probability statistical parameters configured as data object files based on data models established by said second computer module; and
determining if a current loan under analysis saved in a data object file is a last loan to be analyzed by said mathematical computer module.

16. The system of claim 14, wherein said cash flow computer module processes a set of computer logic instructions comprising:
retrieving a number of loans in a deal data object structure;
processing said deal data object structure using an amortization computer module that processes a set of computer logic instructions comprising amortizing loan balances based on a product type of the loan;
sequentially calculating several current period cash flows based on a performing loan balance from a prior period using a cash flow projection computer module that processes a set of computer logic instructions;
calculating credit losses based on non-performing dollars that are projected to transition from delinquency status to real estate owned (REO), and from delinquency status to pre-foreclosure sale using said third computer module;
integrating cash flows from said amortization computer module, said cash flow projection computer module, and said third computer module; and
aggregating credit loss cash flows and outputting aggregated summaries as electronic reports presented on said display device.

17. The system of claim 4, wherein said third computer module processes a set of computer logic instructions comprising projecting credit losses on loan balances that are 90+ days delinquent at a beginning of a projection period, and on loan balances that are projected to go to either foreclosure completion or to an alternative foreclosure resolution from said second computer module.

18. The system of claim 17, wherein said third computer module processes a set of computer logic instructions comprising:
   calculating a credit loss timeline and a real estate owned (REO) property value using a processing module that processes a set of computer logic instructions; and
   determining, using a first processing circuit, whether there is mortgage insurance coverage associated with a particular mortgage loan.

19. The system of claim 18, wherein said third computer module processes a set of computer logic instructions comprising:
   calculating a mortgage insurance payment using a module that processes a set of computer logic instructions; and
   determining, using a second processing circuit, if a mortgage insurance conveyance exists.

20. The system of claim 18, wherein said third computer module processes a set of computer logic instructions comprising:
   calculating a charge-off amount using said first sub-computer module; and
   calculating a REO expense amount using said second sub-computer module.

* * * * *